US007619778B2

(12) United States Patent
Inoue

(10) Patent No.: US 7,619,778 B2
(45) Date of Patent: *Nov. 17, 2009

(54) METHOD OF GENERATING A THRESHOLD MATRIX FOR PRODUCING A COLOR SEPARATION, THE MATRIX HAVING A VARIED INTENSITY DISTRIBUTION, METHOD OF REPRODUCING A COLOR IMAGE USING THE THRESHOLD MATRIX, APPARATUS FOR PRODUCING THE COLOR SEPARATION, AND THE THRESHOLD MATRIX

(75) Inventor: Yoshiaki Inoue, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 504 days.

This patent is subject to a terminal disclaimer.

(21) Appl. No.: 11/338,831

(22) Filed: Jan. 25, 2006

(65) Prior Publication Data

US 2006/0164699 A1 Jul. 27, 2006

(30) Foreign Application Priority Data

Jan. 25, 2005 (JP) ............................. 2005-017370

(51) Int. Cl.
 H04N 1/46 (2006.01)
(52) U.S. Cl. ...................... 358/3.1; 358/3.06; 358/3.13; 358/534
(58) Field of Classification Search ............. 358/3.06, 358/3.14, 3.13, 533–534, 3.19, 3.1
 See application file for complete search history.

(56) References Cited

U.S. PATENT DOCUMENTS

| 3,983,319 | A | 9/1976 | Moe et al. |
| 5,124,803 | A | 6/1992 | Troxel |
| 5,315,406 | A * | 5/1994 | Levien ........................ 358/3.2 |
| 5,689,623 | A * | 11/1997 | Pinard ........................ 358/1.6 |

(Continued)

FOREIGN PATENT DOCUMENTS

JP 61-248661 11/1986

(Continued)

OTHER PUBLICATIONS

Dalton, John C., Perception of binary texture and the generation of stochastic halftone screens, Proc. SPIE 2411, 207, 1995.*

(Continued)

Primary Examiner—Kimberly A Williams
(74) Attorney, Agent, or Firm—Sughrue Mion, PLLC

(57) ABSTRACT

Threshold matrixes for a C-separation and an M-separation of main colors are used to convert a continuous-tone image subjected to color separation into dot patterns for the C-separation and the M-separation. The dot patterns are binary images in which no screen ruling or screen angle is defined. Then, a color image is reproduced by overlaying the dot patterns for the C-separation and the M-separation. When the dot patterns for the C-separation and the M-separation are converted into patterns in the frequency domain, main frequency components obtained by the conversion have a substantially-constant predetermined pattern frequency for all angles, and the intensity distribution of the main frequency components is varied based on the C-separation and the M-separation.

25 Claims, 30 Drawing Sheets

U.S. PATENT DOCUMENTS

| | | | |
|---|---|---|---|
| 5,726,772 A * | 3/1998 | Parker et al. | 358/3.19 |
| 5,731,884 A | 3/1998 | Inoue | |
| 5,734,759 A | 3/1998 | Hirota et al. | |
| 5,815,286 A | 9/1998 | Matsuba et al. | |
| 5,831,626 A | 11/1998 | Sano et al. | |
| 5,832,122 A | 11/1998 | Shimazaki | |
| 5,867,607 A | 2/1999 | Shibuya et al. | |
| 5,884,013 A | 3/1999 | Bosschaerts et al. | |
| 5,943,143 A | 8/1999 | Kawai et al. | |
| 6,101,002 A | 8/2000 | Urasawa | |
| 6,172,770 B1 | 1/2001 | Inoue | |
| 6,288,795 B1 | 9/2001 | Urasawa | |
| 6,335,989 B1 * | 1/2002 | Lin | 382/260 |
| 6,493,112 B1 | 12/2002 | Arce et al. | |
| 6,501,567 B2 | 12/2002 | Sharma et al. | |
| 6,573,917 B2 | 6/2003 | Sadka | |
| 6,710,778 B2 * | 3/2004 | Cooper | 345/596 |
| 6,714,320 B1 | 3/2004 | Nakahara et al. | |
| 6,798,537 B1 | 9/2004 | Lau et al. | |
| 6,813,044 B2 * | 11/2004 | Rylander | 358/3.13 |
| 6,906,825 B1 | 6/2005 | Nakahara et al. | |
| 6,934,054 B1 | 8/2005 | Hilsdorf et al. | |
| 7,245,402 B2 | 7/2007 | McCrea et al. | |
| 2001/0012129 A1 | 8/2001 | Inoue | |
| 2001/0013941 A1 * | 8/2001 | Ogiyama et al. | 358/1.9 |
| 2002/0186418 A1 * | 12/2002 | Inoue | 358/3.14 |
| 2003/0043414 A1 | 3/2003 | Brady | |
| 2003/0053085 A1 | 3/2003 | Takemoto | |
| 2003/0081258 A1 | 5/2003 | Sugizaki | |
| 2003/0107768 A1 | 6/2003 | Crounse | |
| 2003/0218780 A1 | 11/2003 | Braun et al. | |
| 2004/0114168 A1 | 6/2004 | Kuiper | |
| 2005/0195442 A1 * | 9/2005 | Inoue et al. | 358/3.14 |
| 2006/0164698 A1 | 7/2006 | Kurumisawa | |
| 2006/0164699 A1 | 7/2006 | Inoue | |
| 2006/0221400 A1 * | 10/2006 | Sugizaki | 358/3.13 |
| 2007/0046961 A1 | 3/2007 | Kashibuchi et al. | |
| 2007/0127837 A1 | 6/2007 | Ishii | |

FOREIGN PATENT DOCUMENTS

| | | |
|---|---|---|
| JP | 62-044744 | 2/1987 |
| JP | 64-44583 A | 2/1989 |
| JP | 02-202174 | 8/1990 |
| JP | 8-265566 A | 10/1996 |
| JP | 2001-028685 A | 1/2001 |
| JP | 2001-292317 A | 10/2001 |
| JP | 2002-368995 A | 12/2002 |
| JP | 2002-369005 A | 12/2002 |
| JP | 3400316 B2 | 2/2003 |
| JP | 2003-143405 A | 5/2003 |
| JP | 2003-152999 A | 5/2003 |
| JP | 2003-204433 A | 7/2003 |
| JP | 3461377 B2 | 8/2003 |
| JP | 2004-015410 A | 1/2004 |
| JP | 2005-252881 A | 9/2005 |
| WO | WO 02/065755 A1 | 8/2002 |

OTHER PUBLICATIONS

Damera-Venkata, Niranjan and Lin, Qian, "AM-FM Screen Design using Donut Filters", Proc. SPIE-IS&T Electronic Imaging, vol. 5293, 2004.*

J. Sullivan, et al., "Design of Minimum Visual Modulation Halftone Patterns", IEEE Transactions on Systems, Man, and Cybernetics, vol. 21, No. 1, Jan./Feb., 1991, pp. 33-38.

European Search Report dated Jul. 30, 2007.

Lau, Arce and Gallagher, "Digital halftoning by means of green-noise masks", vol. 16, No. 7, Jul. 1999, Journal Optical Society of America, pp. 1575-1586.

Lau, Arce and Gallagher, "Green-Noise Digital Halftoning", Proceedings of the IEEE, vol. 86, No. 12, Dec. 1998, pp. 2424-2444.

USPTO Office Action issued for U.S. Appl. No. 12/235,331 (Co-pending Application) Mailed Jun. 30, 2009.

USPTO Office Action issued for U.S. Appl. No. 11/071,552 (Co-pending Application) Mailed Jun. 08, 2009.

* cited by examiner

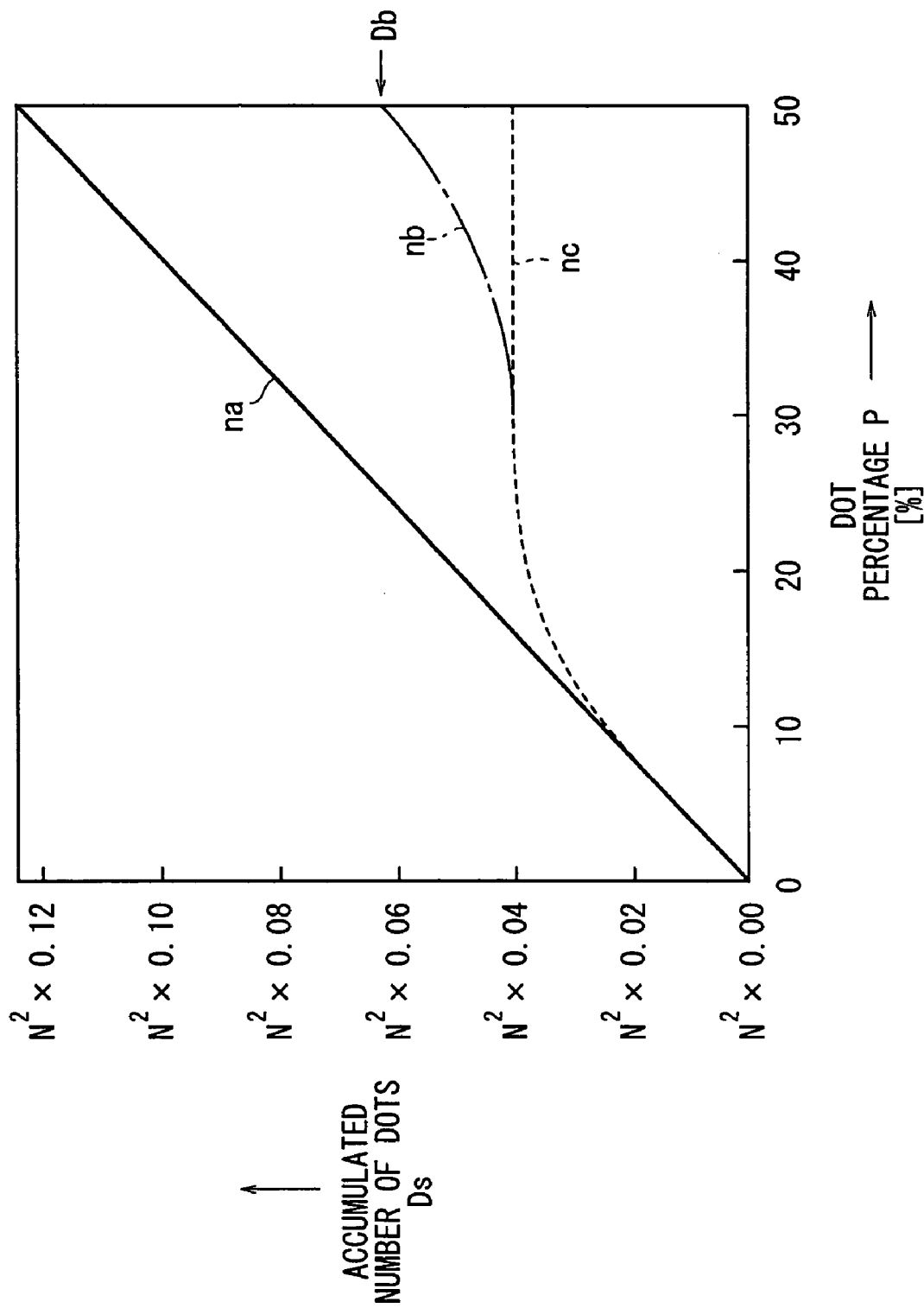

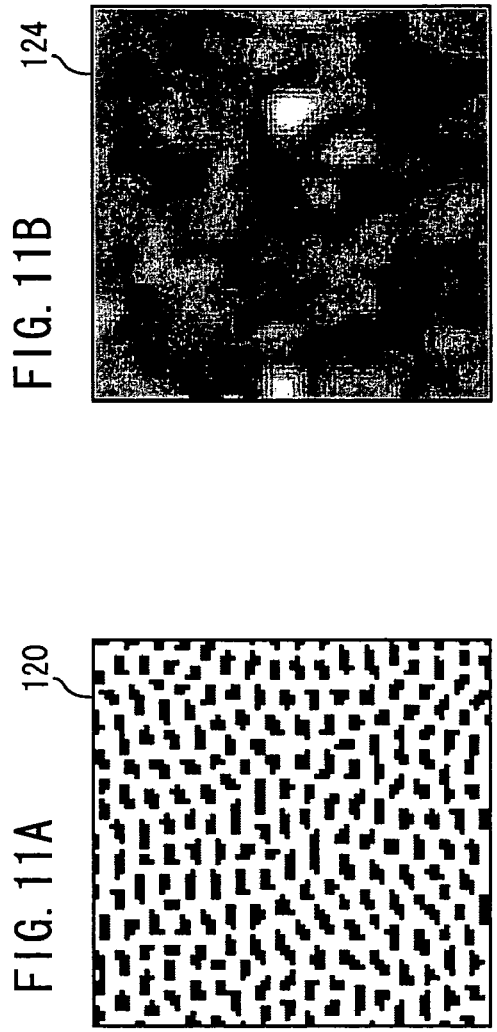
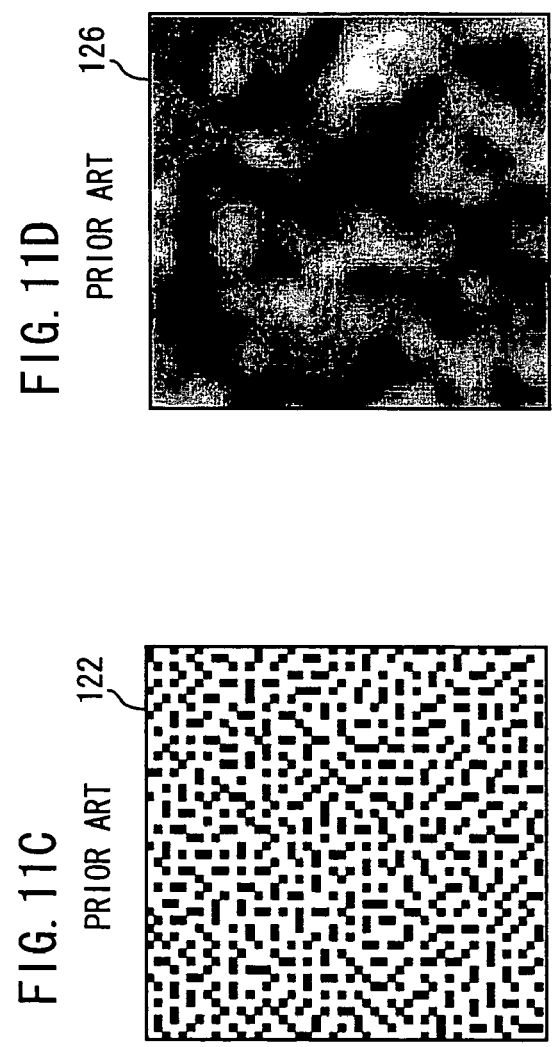

(22.5°, 112.5°)

(22.5°, 112.5°)

(67.5°, 157.5°)

(67.5°, 157.5°)

(45°, 105°, 165°)

(15°, 75°, 135°)

C(67.5°)

M(157.5°)

Y(22.5°)

K(112.5°)

184a

184b

186

190a
190pa 190b
190pa 192
192p
r

METHOD OF GENERATING A THRESHOLD MATRIX FOR PRODUCING A COLOR SEPARATION, THE MATRIX HAVING A VARIED INTENSITY DISTRIBUTION, METHOD OF REPRODUCING A COLOR IMAGE USING THE THRESHOLD MATRIX, APPARATUS FOR PRODUCING THE COLOR SEPARATION, AND THE THRESHOLD MATRIX

BACKGROUND OF THE INVENTION

1. Field of the Invention

The present invention relates to a method of generating a threshold matrix for producing a color separation, a method of reproducing a color image, an apparatus for producing a color separation, and a threshold matrix, for producing each of color separations, the threshold matrix converting a continuous-tone image subjected to color separation into a dot pattern for each of the color separations, a color image being reproduced by overlaying the dot patterns, the dot pattern being a binary image in which no screen ruling or screen angle is defined. More particularly, the present invention relates to a method of generating a threshold matrix for producing a color separation, a method of reproducing a color image, an apparatus for producing a color separation, and a threshold matrix, which are preferably applicable to a printing-related apparatus (output system) such as a filmsetter, a CTP (Computer To Plate) apparatus, a CTC (Computer To Cylinder) apparatus, a DDCP (Direct Digital Color Proof) system, etc., an ink jet printer, or an electrophotographic printer, for example.

A dot pattern representative of a binary image in which no screen ruling or screen angle is defined is called a pattern of an FM screen or a stochastic screen.

2. Description of the Related Art

Heretofore, so-called AM (Amplitude Modulation) screens characterized by screen ruling, screen angle, and dot shape, and FM (Frequency Modulation) screens have been used in the art of printing.

A process of generating a threshold matrix for FM screens is disclosed in Japanese Laid-Open Patent Publication No. 8-265566.

According to the disclosed process, an array of elements of a threshold matrix, i.e., an array of thresholds, is generated in an ascending order or a descending order by determining threshold positions such that the position of an already determined threshold is spaced the greatest distance from the position of a threshold to be newly determined. The dot pattern of a binary image that is generated using the threshold matrix thus produced has dots which are not localized. Even when a dot pattern is generated using a plurality of such threshold matrixes that are juxtaposed, the dot pattern does not suffer a periodic pattern produced by the repetition of threshold matrixes.

A plurality of patent documents given below are relevant to the generation of a threshold matrix.

Japanese Patent No. 3400316 discloses a method of correcting halftone image data by extracting a pixel having a weakest low-frequency component of a certain dot pattern, from white pixels (unblackened pixels), and a pixel having a strongest low-frequency component of the dot pattern, from blackened pixels, and switching around the extracted white and blackened pixels. Thus, the dot pattern is intended to be smoothed or leveled.

Japanese Laid-Open Patent Publication No. 2001-292317 reveals a process of determining threshold positions in a threshold matrix such that a next blackened pixel is assigned to a position having a weakest low-frequency component of the threshold matrix.

Japanese Laid-Open Patent Publication No. 2002-368995 shows a process of determining threshold positions in a threshold matrix such that when an array of thresholds in the threshold matrix has been determined up to a certain gradation and a threshold position for a next gradation is to be determined, blackened pixels are assigned to positions for not strengthening a low-frequency component.

Japanese Laid-Open Patent Publication No. 2002-369005 discloses a process of generating a threshold matrix according to the process shown in Japanese Patent No. 3400316, Japanese Laid-Open Patent Publication No. 2001-292317 or Japanese Laid-Open Patent Publication No. 2002-368995, based on an ideal dot pattern at a certain gradation which is given.

When an FM screen is used for offset printing, it causes shortcomings in that the quality of printed images suffers some graininess (grainness). FM screens also cause disadvantages in that a dot gain tends to become large and images are reproduced unstably when images are printed, or when films are output in an intermediate printing process, or when a printing plate is output by a CTP apparatus.

According to the conventional FM screening process, when a dot size is determined to be the size of a dot made up of one pixel or a dot made up of four pixels according to a 1 (1×1)-pixel FM screen or a 4 (2×2)-pixel FM screen, an array of thresholds of a threshold matrix is determined by an algorithm for generating FM screens, thus determining an output quality, and only the dot size serves as a parameter for determining the quality of FM screens. For example, if a dot size is determined to be a 3×3-pixel FM screen dot size with respect to an output system which is incapable of stably reproducing 2×2-pixel FM screen dots for highlight areas, then the resolution (referred to as pattern frequency or pattern resolution) for intermediate tones is lowered, resulting in a reduction in the quality of images.

FIG. 27 of the accompanying drawings shows a conventional dot pattern 1 in a highlight area HL where the dot percentage of a 2×2-pixel FM screen is 5%, a conventional dot pattern 2 in an intermediate tone area where the dot percentage of the 2×2-pixel FM screen is 50%, a conventional dot pattern 3 in a highlight area HL where the dot percentage of a 3×3-pixel FM screen is 5%, and a conventional dot pattern 4 in an intermediate tone area where the dot percentage of the 3×3-pixel FM screen is 50%.

FIG. 28 of the accompanying drawings shows a power spectrum generated when the dot pattern 2 of the 2×2-pixel FM screened shown in FIG. 27 is FFTed (Fast-Fourier-Transformed), and FIG. 29 of the accompanying drawings shows a power spectrum generated when the dot pattern 4 of the 3×3-pixel FM screen shown in FIG. 27 is FFTed.

In FIG. 27, at the dot percentage of 50% in the intermediate tone area, the dot pattern 2 of the 2×2-pixel FM screen suffers less graininess than the dot pattern 4 of the 3×3-pixel FM screen, but has the dot percentage less reproducible in the printed image. On the other hand, at the dot percentage of 50% in the intermediate tone area, a peak value of the dot pattern 4 of the 3×3-pixel FM screen has a pattern frequency 6 of about 13 c/mm which is lower than the pattern frequency 5 of about 20 c/mm of the dot pattern 2 of the 2×2-pixel FM screen. The pattern frequencies 5, 6 which are of peak values are also called a peak spatial frequency fpeak.

The output resolution of an output system such as an imagesetter, a CTP (Computer To Plate) apparatus, etc. (the output resolution of an output system will hereinafter be referred to as output resolution R) is set to 2540 pixels/inch=100 pixels/ mm or 2400 pixels/inch=94.488 pixels/mm, for example. With those settings, the dot size of the 1×1 pixel FM screen is 10 μm×10 μm (or 10.6 μm×10.6 μm), and the dot size of the 2×2 pixel FM screen is 20 μm×20 μm (or 21.2 μm×21.2 μm).

In this description, the output resolution R is different from the pattern frequencies 5, 6 (fpeak) of the dot patterns 2, 4 shown in FIGS. 27, 28.

Technical solutions for the above problems are suggested in Japanese Laid-Open Patent Publication No. 2005-252881.

Japanese Laid-Open Patent Publication No. 2005-252881, however, aims to reduce graininess in an image when a single color separation is used. Then, it has been found that the graininess may be recognized when a color image is reproduced by overlaying a plurality of color separations, even if the graininess is not recognized in an image as a single separation.

Specifically, this problem will be described below, referring to a color image shown in FIG. 30C obtained by overlaying (superimposing) two major color separations of a C-separation (Cyan) shown in FIG. 30A and an M-separation (Magenta) shown in FIG. 30B.

FIG. 30A illustrates a dot pattern 302 for the C-separation in the space domain. FIG. 30B illustrates a dot pattern 304 for the M-separation in the space domain. FIG. 30C illustrates a dot pattern 306 of a color image obtained by overlaying the dot patterns 302, 304 for the C-separation and the M-separation. In the overlaid dot pattern 306 of a color image, a low-frequency component, i.e., the graininess is recognized.

In this explanation, a dot percentage of the dot patterns 302, 304 is 50%. It is also possible to confirm whether the graininess is recognized when dot patterns having arbitrary dot percentages are overlaid, e.g., a dot pattern with a dot percentage of 40% and a dot pattern with a dot percentage of 55%.

FIG. 30D illustrates frequency-domain data 308 obtained by the Fourier Transform of the dot pattern 302. FIG. 30E illustrates frequency-domain data 310 obtained by the Fourier Transform of the dot pattern 304. FIG. 30F illustrates frequency-domain data 312 obtained by the Fourier Transform of the dot pattern 306. The deep black portion in the frequency-domain data 308, 310, 312 corresponds to the portion where the frequency component is strong.

The frequency-domain data 312 shown in FIG. 30F can be obtained through the convolution operation of the frequency-domain data 308 and the frequency-domain data 310.

Each of the frequency-domain data 308, 310, 312 has each of main frequency components 308p, 310p, 312p, and a minute component. Each of the main frequency components 308p, 310p, 312p has a ring shaped distribution with a constant range ±Δ and a radius (pattern frequency or peak frequency) r. The minute component spreads over the entire frequency domain appearing a light gray color, but is not visually recognized as the graininess of a low frequency component. However, in the overlaid frequency-domain data 312, it is recognized that a low frequency component 314 including the frequency component of zero is present. It has been found that the low frequency component 314 causes a low frequency component in the dot pattern 306 of a color image, i.e., the graininess in the image.

In the explanation below, when illustrating that the dot pattern in the space-domain is converted into the components in the frequency-domain, only main frequency components forming some shape such as a ring and partial rings, and low frequency components causing the graininess will be illustrated in the figures. Other minute components unrelated to the graininess will not be illustrated for easy understanding of the figures.

SUMMARY OF THE INVENTION

It is an object of the present invention to provide a method of generating a threshold matrix for producing a color separation, a method of reproducing a color image, an apparatus for producing a color separation, and a threshold matrix, which are capable of reducing the graininess in a color image reproduced by overlaying (superimposing) dot patterns for color separations, each of the dot patterns being a binary image in which no screen ruling or screen angle is defined.

According to the present invention, there is provided a method of generating a threshold matrix for producing each of color separations, the threshold matrix converting a continuous-tone image subjected to color separation into a dot pattern for each of the color separations, a color image being reproduced by overlaying the dot patterns, each of the dot patterns being a binary image in which no screen ruling or screen angle is defined, the method comprising the steps of: determining a pattern frequency at a predetermined dot percentage of an intermediate tone; and filtering a white noise pattern with a bandpass filter having a different characteristic for each of the color separations, digitizing a filtered pattern for obtaining a binary pattern, and determining a dot candidate position for placing a dot in a dot pattern based on the obtained binary pattern to obtain an array of the threshold, the bandpass filter having a main frequency of a bandpass characteristic that is substantially same as the pattern frequency, intensity distribution of the bandpass characteristic being modulated based on angles, and the intensity distribution being varied based on each of the color separations.

Using thus-generated threshold matrixes for color separations, screening is applied to a continuous-tone image to obtain dot patterns as binary images for the color separations. Then, it is possible to reduce the graininess in the color image reproduced by overlaying the dot patterns for the color separations. The "screening" means a process for converting a continuous-tone image into a dot pattern of binary image, including the calculation operation therefor.

The method of generating a threshold matrix for producing a color separation according to the present invention is described as one example, and it is a matter of course that a threshold matrix having similar frequency characteristics can be generated in another way.

Further, according to the present invention, there is provided a method of reproducing a color image by overlaying dot patterns for color separations, a threshold matrix for each of the color separations being used to convert a continuous-tone image subjected to color separation into a dot pattern for each of the color separations, each of the dot patterns being a binary image in which no screen ruling or screen angle is defined, wherein when the dot pattern for each of the color separations is converted into a pattern in a frequency domain, a main frequency component obtained by the conversion has a substantially-constant predetermined pattern frequency for all angles, and the intensity distribution of the main frequency component is varied based on each of the color separations.

Furthermore, according to the present invention, there is provided an apparatus for producing a color separation, a threshold matrix for each of color separations being used to convert a continuous-tone image subjected to color separation into a dot pattern for each of the color separations, each of the dot patterns being a binary image in which no screen ruling or screen angle is defined, a color image being reproduced by overlaying the dot patterns, wherein when the dot pattern for each of the color separations is converted into a pattern in a frequency domain, a main frequency component obtained by the conversion has a substantially-constant predetermined pattern frequency for all angles, and the intensity distribution of the main frequency component is varied based on each of the color separations.

Further still, according to the present invention, there is provided a threshold matrix for producing each of color separations, the threshold matrix converting a continuous-tone image subjected to color separation into a dot pattern for each of the color separations, a color image being reproduced by overlaying the dot patterns, each of the dot patterns being a binary image in which no screen ruling or screen angle is defined, wherein when the dot patterns are produced for the color separations with the threshold matrixes and when the dot pattern for each of the color separations is converted into a pattern in a frequency domain, a main frequency component obtained by the conversion has a substantially-constant predetermined pattern frequency for all angles, and the intensity distribution of the main frequency component is varied based on each of the color separations.

According to the present invention, when the dot patterns are produced for the color separations with the threshold matrixes and when the dot pattern for each of the color separations is converted into a pattern in a frequency domain, a main frequency component obtained by the conversion has a substantially-constant predetermined pattern frequency for all angles, and the intensity distribution of the main frequency component is varied based on each of the color separations.

When thus-produced dot patterns for the color separations are overlaid to reproduce a color image, the graininess in the reproduced color image can be reduced.

In the method of generating a threshold matrix for producing each of color separations, when an angle at which the intensity distribution of the bandpass characteristic for angles has a peak of intensity may be varied based on each of the color separations, a directional characteristic is weakened, so that the graininess in the reproduced color image can be reduced further.

When the dot pattern for each color separation is generated as a two-dimensional scanning image, the intensity distribution of the bandpass characteristic for angles may not be present or be weakened in a scanning direction of the two-dimensional scanning image. Thus, the affecting by the variation of a scanning exposure system can be reduced.

When the color separations in which the intensity distribution of the bandpass characteristic for angles is varied may comprise at least two color separations, the graininess in the reproduced color image can be reduced significantly.

When the color separations in which the intensity distribution of the bandpass characteristic for angles is varied may comprise CM-separations, CMK-separations, or CMYK-separations, the graininess of the main colors in the reproduced color image can be reduced. Thus, the graininess in the reproduced color image can be reduced generally.

When the color separations in which the intensity distribution of the bandpass characteristic for angles is varied may comprise CMYK-separations, and when frequency components of the CMYK-separations may be spaced equiangularly, there is no directional characteristic in colors themselves, so that the graininess in the reproduced color image can be reduced.

When the color separations in which the intensity distribution of the bandpass characteristic for angles is varied may comprise main CMYK-separations as main colors and an auxiliary color separation other than the CMYK-separations, and when frequency components may be spaced equiangularly for the main CMYK-separations and frequency components for the auxiliary color separation may be provided between the equiangularly-spaced frequency components for the main CMYK-separations, the graininess of the main colors, which affect a color image so much, can be reduced in the reproduced color image.

Also, in each of the method of reproducing a color image, the apparatus for producing a color separation, and the threshold matrix, when an angle at which the intensity distribution of the main frequency component has a peak of intensity may be varied based on each of the color separations, a directional characteristic is weakened, so that the graininess in the reproduced color image can be reduced further.

When the dot pattern for each color separation is generated as a two-dimensional scanning image, the intensity distribution of the main frequency component may not be present or be weakened in a scanning direction of the two-dimensional scanning image. Thus, the affecting by the variation of a scanning exposure system can be reduced.

When the color separations in which the intensity distribution of the main frequency component is varied may comprise at least two color separations, the graininess in the reproduced color image can be reduced significantly.

When the color separations in which the intensity distribution of the main frequency component is varied may comprise CM-separations, CMK-separations, or CMYK-separations, the graininess of the main colors in the reproduced color image can be reduced. Thus, the graininess in the reproduced color image can be reduced generally.

When the color separations in which the intensity distribution of the main frequency component is varied may comprise CMYK-separations, and when frequency components of the CMYK-separations may be spaced equiangularly, there is no directional characteristic in colors themselves, so that the graininess in the reproduced color image can be reduced.

When the color separations in which the intensity distribution of the main frequency component is varied may comprise main CMYK-separations as main colors and an auxiliary color separation other than the CMYK-separations, and when frequency components may be spaced equiangularly for the main CMYK-separations and frequency components for the auxiliary color separation may be provided between the equiangularly-spaced frequency components for the main CMYK-separations, the graininess of the main colors, which affect a color image so much, can be reduced in the reproduced color image.

According to the present invention, the graininess in a color image reproduced by overlaying dot patterns for color separations can be reduced, each of the dot patterns being a binary image in which no screen ruling or screen angle is defined.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 6 is a diagram showing the number of dots vs. dot percentage;

FIG. 11A is a diagram showing a dot pattern having 2×2-pixel dots of a minimum size and a dot percentage of 30%;

FIG. 11B is a diagram showing a pattern with stressed dark and light areas which is produced by processing the dot pattern shown in FIG. 11A with a visual characteristic filter;

FIG. 11C is a diagram showing a dot pattern of a conventional 2×2-pixel dot FM screen;

FIG. 11D is a diagram showing a pattern with stressed dark and light areas which is produced by processing the dot pattern shown in FIG. 11C with a visual characteristic filter;

DESCRIPTION OF THE PREFERRED EMBODIMENTS

Figure 1:
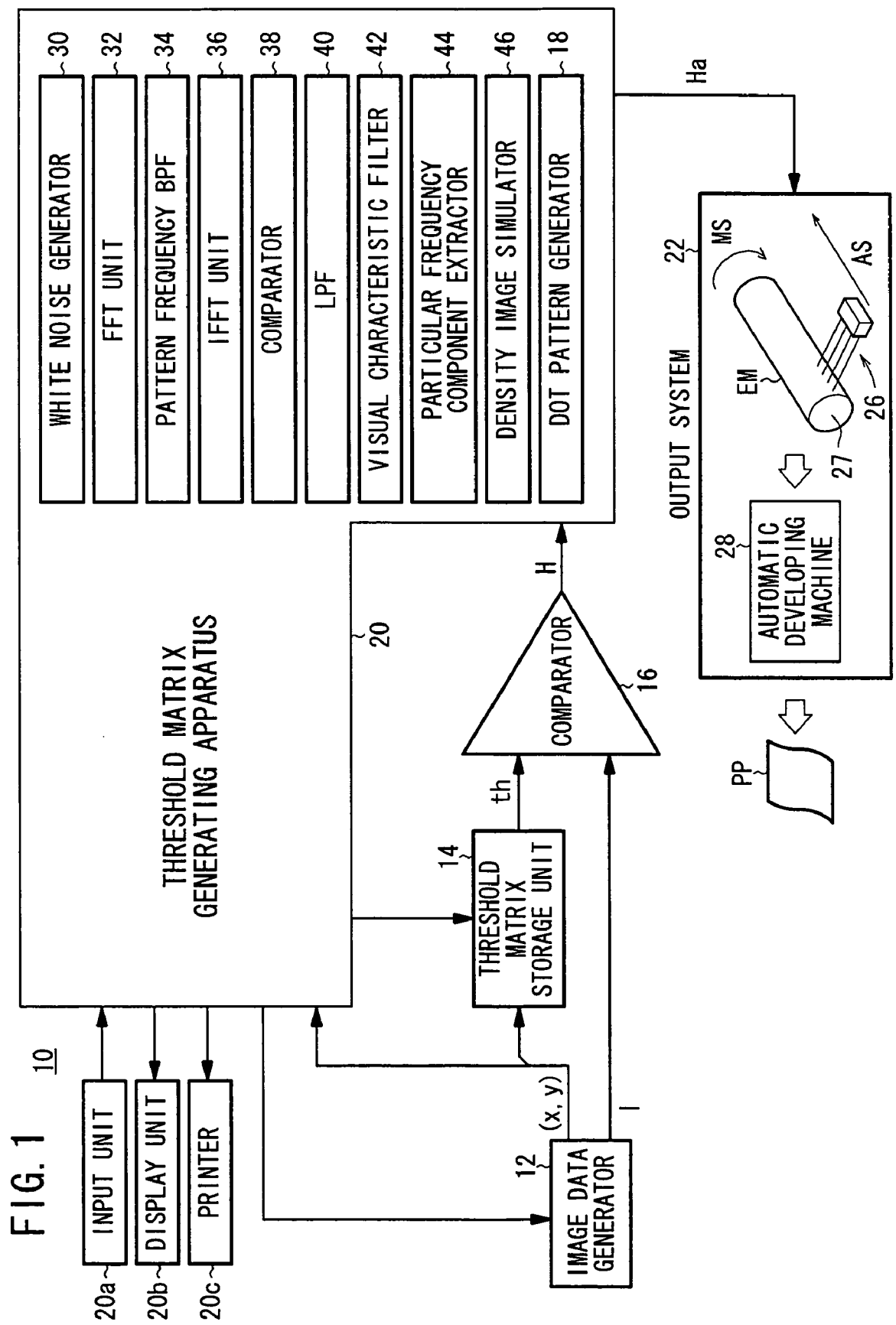
FIG. 1 is a block diagram of a threshold matrix generating system to which a process of generating a threshold matrix according to an embodiment of the present invention is applied.

FIG. 1 shows a basic arrangement of a threshold matrix generating system 10 to which a process of generating a threshold matrix according to the present invention is applied.

As shown in FIG. 1, the threshold matrix generating system 10 has an image data generator 12 for generating continuous-tone image data I including a test pattern of uniform density and also generating a two-dimensional address (x, y) of the image data I, a threshold matrix storage unit 14 for storing a plurality of threshold matrixes TM and outputting a threshold th read by the address (x, y), a comparator 16 for comparing the threshold th and the image data I and outputting binary image data H, a threshold matrix generating apparatus 20 including a dot pattern generator 18 for generating dot pattern data Ha corresponding to the binary image data H output from the comparator 16, the threshold matrix generating apparatus 20 serving to determine a threshold array (threshold positions) of the threshold matrixes TM such that a dot pattern represented by the dot pattern data Ha will be a desired dot pattern, and an output system 22 for forming the dot pattern corresponding to the dot pattern data Ha on a film, a printing plate PP, or a printed material.

The threshold matrix storage unit 14 comprises a recording medium such as a hard disk or the like. The image data generator 12, the comparator 16, the dot pattern generator 18, and the threshold matrix generating apparatus 20 may comprise function realizing means that are achieved when a program stored in a personal computer (including a CPU, a memory, an input unit 20a such as a keyboard, a mouse, etc., and an output unit such as a display unit 20b, a printer 20c, etc.) is executed by the computer.

The function realizing means of the threshold matrix generating apparatus 20 may comprise a piece of hardware. An arrangement and operation of the function realizing means of the threshold matrix generating apparatus 20 will be described later on.

In the present embodiment, the output system 22 basically comprises a CTP apparatus having an exposure unit (also referred to as a multi-beam exposure unit) 26 and a drum 27 with printing plate materials EM wound thereon. The exposure unit 26 applies a plurality of laser beams (recording beams), which are turned on and off for each pixel depending on the dot pattern data Ha, to the printing plate materials EM on the drum 27 that is being rotated in a main scanning direction MS by a main scanning motor (not shown) at a high speed, while the exposure unit 26 is being moved in an auxiliary scanning direction AS along the axis of the drum 27 by an auxiliary scanning motor (not shown). At this time, a dot pattern representing a two-dimensional image as a latent image is formed on each of the printing plate materials EM. The laser beams applied to the printing plate materials EM may be in several hundred channels.

The printing plate materials EM (usually, four printing plate materials with different screen angles for C, M, Y, K printing plates) on which the dot patterns are formed as latent images are developed by an automatic developing machine 28, producing printing plates PP with visible dot patterns formed thereon. The produced printing plates PP are mounted on a printing press (not shown), and inks are applied to the mounted printing plates PP.

When the inks applied to the printing plates PP are transferred to a printing sheet as a recording medium such as a photographic sheet or the like, a desired printed material comprising an image formed on the printing sheet is obtained.

As mentioned later, the output system 22 is not limited to the scanning exposure apparatus including an electrophotographic copy machine etc. employing laser beams, but may be an apparatus for forming an image on a film, a printing plate, or a printed material according to a planar exposure process or an ink jet process, or a CTC printing machine.

The threshold array of the threshold matrixes TM stored in the threshold matrix storage unit 14 can be recorded and carried around in a portable recording medium which is a packaged medium such as a DVD, a CD-ROM, a CD-R, a semiconductor memory, or the like.

A process of generating a threshold matrix using the threshold matrix generating system 10 shown in FIG. 1 will be described below with reference to a flowchart of FIG. 2. The process shown in FIG. 2 is based on a program which is mainly executed by the threshold matrix generating apparatus 20.

Figure 2:
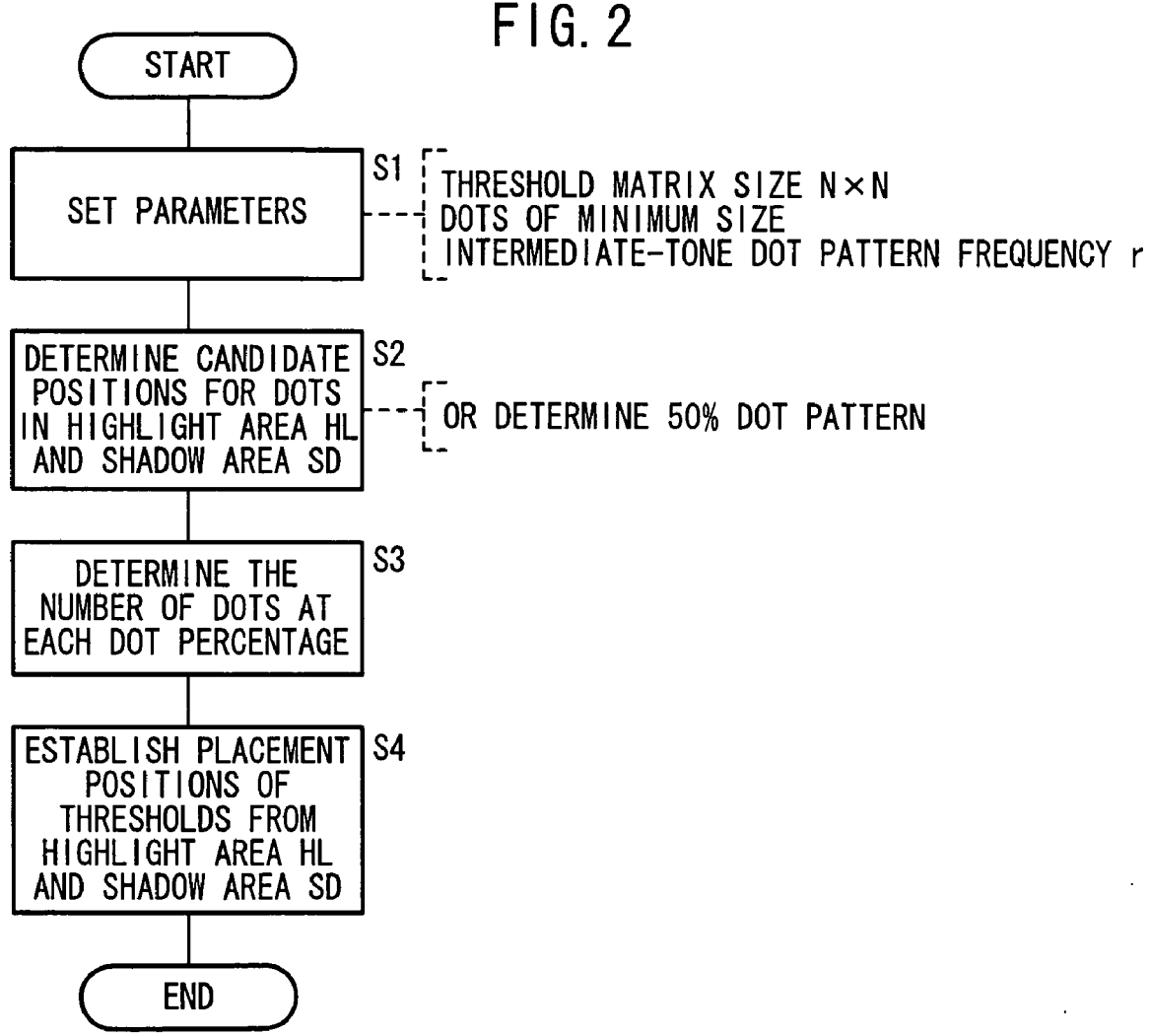
FIG. 2 is a flowchart of an overall sequence of the process of generating a threshold matrix which is carried out by the threshold matrix generating system shown in FIG. 1.

In step S1 shown in FIG. 2, three parameters are set. The first parameter represents the size of a threshold matrix TM to be stored in the threshold matrix storage unit 14, i.e., the size N×N of a threshold matrix TM which contains N×N thresholds corresponding to N×N pixels. The threshold matrix TM contains thresholds th ranging from 0 to thmax at respective positions (elements) determined by addresses (x, y). The maximum threshold thmax has a value that is set to "255" for a system having the 8-bit gradation and "65535" for a system having the 16-bit gradation. The size N×N of a square threshold matrix will be described below. However, the present invention is also applicable to the size N×M of an elongate rectangular threshold matrix. Actually, a plurality of threshold matrixes TM having the same threshold array and matrix size N×N and laid out as tiles (referred to as a superthreshold matrix STM) are used depending on the size of an image to be processed. The thresholds th of the threshold matrix TM are determined in view of the threshold array of the entire superthreshold matrix STM.

In the present embodiment, the size of a pixel that can be output from the output system 22 is represented by 10 μm×10 μm, which corresponds to a 1×1-pixel dot or 1 pixel. The size 10 μm×10 μm is a minimum unit that can be controlled by the exposure unit 26 for recording image data on the printing plate materials EM.

The second parameter represents the number of pixels that make up a dot of a minimum size which can stably be output from the output system 22, or stated otherwise, can stably be formed on the printing plates PP which are output from the output system 22. The dot of a minimum size may be set to a 1-pixel dot (the number of pixels that make up a dot of a minimum size is one), a 2-pixel dot, a 3-pixel dot, a 2×2-pixel (the number of pixels that make up a dot of a minimum size is four) dot, a 2×3-pixel (6-pixel) dot, a 3×3-pixel (9-pixel) dot, etc. In the present embodiment, it is assumed that a dot of a minimum size that can stably be formed on the printing plates PP (in reality, the printed material) is a 2×2-pixel dot whose dot size is represented by 2×2=4 pixels.

The third parameter represents the pattern frequency at a predetermined dot percentage (also referred to as density percentage) in intermediate tones having a dot percentage in the range from 10% to 50%, i.e., the pattern frequency r of an intermediate tone dot pattern. The pattern frequency r of an intermediate tone dot pattern represents the peak spatial frequency fpeak c/mm of a dot pattern in an intermediate tone.

In reality, the peak spatial frequency fpeak is concerned with the reproduction of image details, and also affects image quality in terms of graininess. In the present embodiment, the pattern frequency r is set to a value of 20 c/mm, i.e., 508 (20×25.4) LPI (Line Per Inch) (fpeak=r=20 c/mm).

The pattern frequency r is determined considering a frequency having a predetermined power (intensity or magnitude), e.g., power of ½ or more of the strongest power.

In step S2, a dot candidate position in a highlight area HL and a dot candidate position in a shadow area SD are determined to provide the pattern frequency r in an intermediate tone. Otherwise, a dot candidate position for placing dots is determined at the dot percentage 50% with the pattern frequency r.

Figure 3:
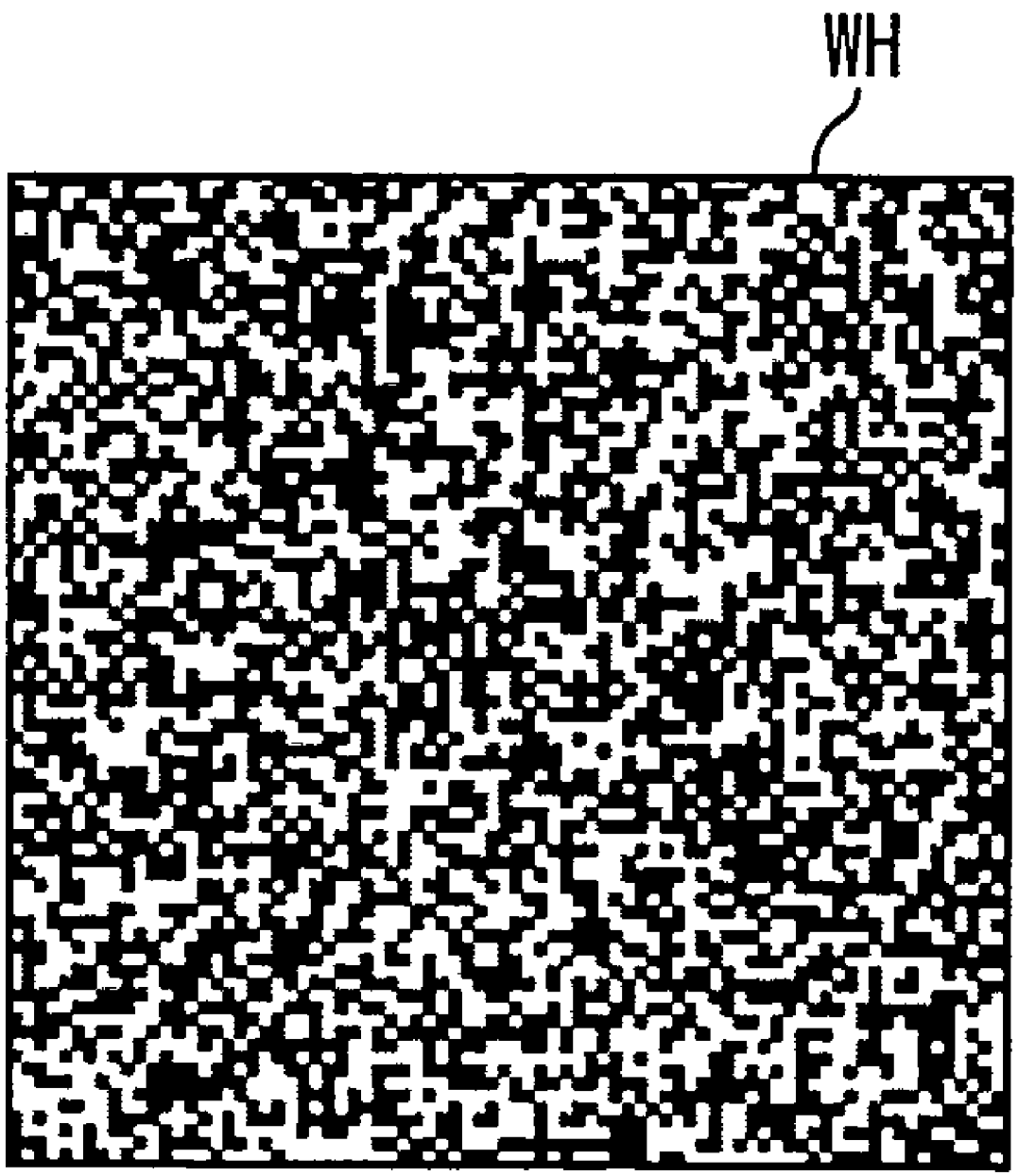
FIG. 3 is a diagram of a white noise pattern generated at a dot percentage of 50% by 1×1 pixel FM-screened dots.

First, as shown in FIG. 3, a white noise generator 30 generates a white noise pattern WH at a dot percentage of 50% having the same size N×N as the size N×N of the threshold matrix TM. The white noise pattern WH is an image where 1-pixel dots are randomly positioned in a spatial domain. The white noise pattern WH can be generated so as to have desired values in an intermediate tone having a dot percentage in the range from 10% to 90%. In this embodiment, the white noise pattern WH at a dot percentage of 50% is generated.

Figure 4A:
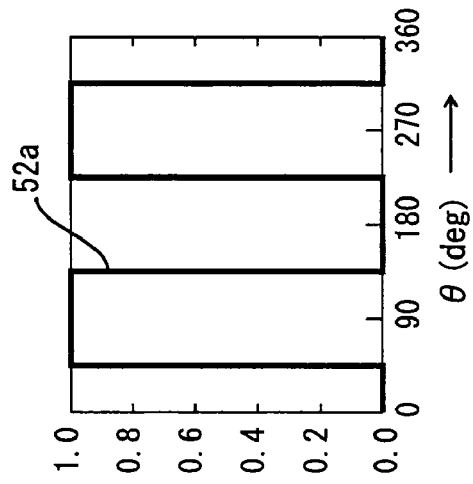
FIG. 4A is a diagram showing the frequency-domain of a pattern frequency bandpass filter.
Figure 5A:
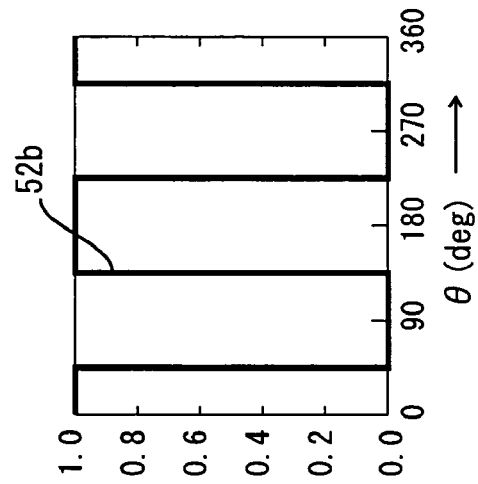
FIG. 5A is a diagram showing the frequency-domain of another pattern frequency bandpass filter where an angle is shifted by 90°.

Second, the white noise pattern WH is FFTed by an FFT (Fast Fourier Transform) unit 32 to be converted into a frequency-domain pattern. Then, the pattern is subjected to a bandpass filtering process at the pattern frequency r (±Δ, "Δ" means a fluctuation component) by a pattern frequency bandpass filter (pattern frequency BPF) 34, as shown in FIGS. 4A, 5A. The pattern frequency bandpass filter 34 has a bandpass characteristic in which a main frequency (or center frequency) thereof is substantially same as the pattern frequency r. The intensity of the bandpass characteristic is modulated based on angles θ.

The characteristics of the pattern frequency bandpass filter 34 can be changed variously. Especially, the intensity of the bandpass characteristic is modulated based on an angle θ, and the intensity distribution of the bandpass characteristic for an angle θ is changed based on color separations.

Hereinafter, a pattern frequency bandpass filter 34C for a C-separation is described with reference to FIGS. 4A and 4B. Also, a pattern frequency bandpass filter 34M for an M-separation is described with reference to FIGS. 5A and 5B.

In this embodiment, the pattern frequency bandpass filter 34C for a C-separation has certain characteristics so that frequency-domain data AFFT2a having arc or partial ring shaped areas can be obtained as shown in FIG. 4A. The frequency-domain data AFFT2a show isotropy at a radius (pattern frequency) r for angles θ including a range (the fluctuation component ±Δ). Also, the pattern frequency bandpass filter 34C for a C-separation has certain characteristics so that the frequency-domain data AFFT2a having a rectangular intensity distribution 52a can be obtained as shown in FIG. 4B, in which the intensity of a dot pattern at angles 0° and 180° corresponding to the main scanning direction MS is weakened. The frequency-domain data AFFT2a is recognized as a pair of opposing circular arcs having a central angle of 90° that are clipped at around 90° and 270° out of a circular ring.

Figure 4B:
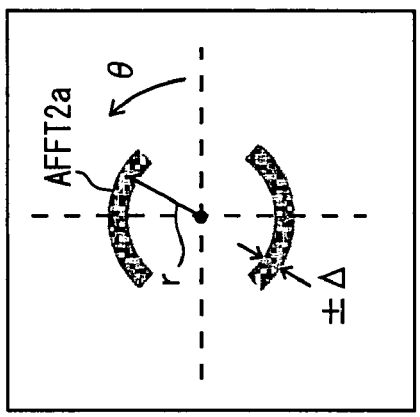
FIG. 4B is a diagram showing intensity vs. angle in FIG. 4A.

In the intensity distribution 52a of a bandpass characteristic for angles θ, in FIGS. 4A and 4B, the intensity is 0 (0.0 in FIG. 4B) for θ having ranges of 0°±45° and 180°±45°, and maximum (1.0 in FIG. 4B) for the other angles. The intensity distribution 52a may be sinusoidal instead of rectangular.

Figure 5B:
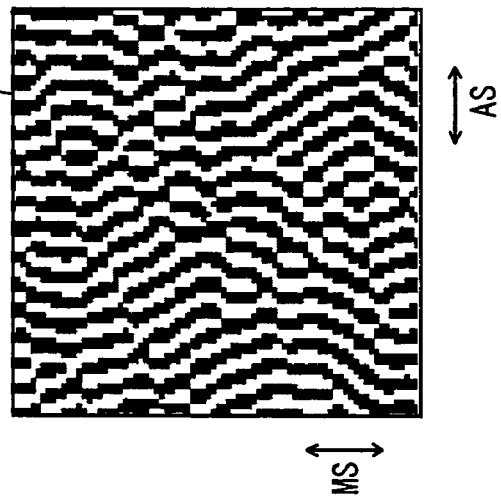
FIG. 5B is a diagram showing intensity vs. angle in FIG. 5A.

Further, the pattern frequency bandpass filter 34M for an M-separation has certain characteristics so that frequency-domain data AFFT2b having arc or partial ring shaped areas can be obtained as shown in FIG. 5A. The frequency-domain data AFFT2b show isotropy at a radius (pattern frequency) r for angles θ including a range (the fluctuation component ±Δ). Also, the pattern frequency bandpass filter 34M for an M-separation has certain characteristics so that the frequency-domain data AFFT2b having a rectangular intensity distribution 52b can be obtained as shown in FIG. 5B, in which the phase of the intensity distribution 52b is shifted from the phase of the intensity distribution 52a by 90°. In the intensity distribution 52b for angles θ, in FIGS. 5A and 5B, the intensity is maximum (1.0 in FIG. 5B) for θ having ranges of 0°±45° and 180°±45°, and 0 (0.0 in FIG. 5B) for the other angles. The intensity distribution 52b may be sinusoidal instead of rectangular.

If the frequency-domain data AFFT2a and the frequency-domain data AFFT2b are simply overlaid, the data of a circular ring will be recognized.

Figure 4C:
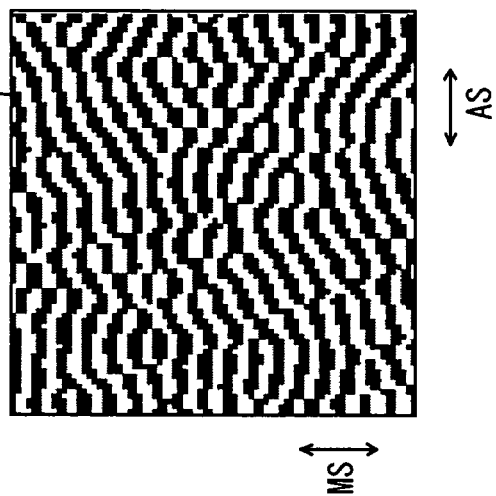
FIG. 4C is a diagram showing space-domain data of a continuous-tone image.
Figure 5C:
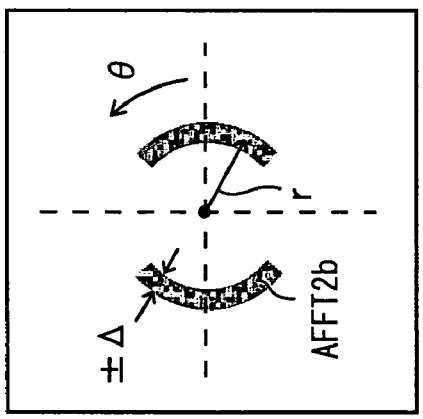
FIG. 5C is a diagram showing space-domain data of a continuous-tone image.

Third, the frequency-domain data AFFT2a, AFFT2b, which has a ring shape with a radius of the pattern frequency r but partially filtering off horizontal and vertical data, is IFFTed by an IFFT (Inverse Fast Fourier Transform) unit 36, producing space-domain data A2a, A2b of continuous-tone images, as shown in FIGS. 4C, 5C.

In FIGS. 4C, 5C, the auxiliary scanning direction AS of a dot pattern is perpendicular to the vertical axis in the figure (parallel to the horizontal axis), while the main scanning direction MS of a dot pattern is perpendicular to the horizontal axis in the figure (parallel to the vertical axis). The angles θ corresponding to the main scanning direction MS in the dot pattern in FIGS. 4C, 5C are 0° and 180° in FIGS. 4A, 4B, 5A and 5B.

Figure 4D:
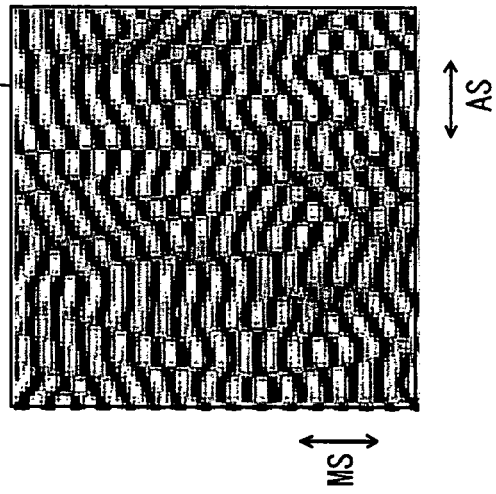
FIG. 4D is a diagram showing binary data digitized from the space-domain data of the continuous-tone image.
Figure 5D:
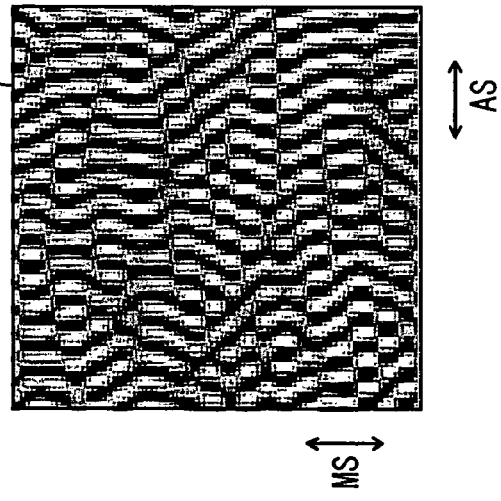
FIG. 5D is a diagram showing binary data digitized from the space-domain data of the continuous-tone image.

Fourth, the value of each of the pixels of the spatial-domain data A2a, A2b is compared with a central gradation value (e.g., 127 if the maximum gradation is 255) by a comparator 38, generating binary data A2a_bin, A2b_bin, as shown in FIGS. 4D, 5D.

Of the binary data A2a_bin, A2b_bin, blackened portions (areas) serve as dot candidate positions in highlight areas HL and white portions (areas) serve as dot candidate positions in shadow areas SD.

The pattern of each of the binary data A2a_bin, A2b_bin shows dot candidate positions, and may not always be produced when the dot percentage is 50%. In this embodiment, however, the binary data A2a_bin, A2b_bin are set to represent a 50% dot pattern.

As stated above, the binary data A2a_bin, A2b_bin can be generated from the white noise pattern WH as follows. The white noise pattern WH in the space-domain is converted into the frequency-domain pattern. The frequency-domain pattern is subjected to a bandpass filtering process at the pattern frequency r by the pattern frequency bandpass filter 34. The frequency-domain pattern is converted again into the space-domain pattern. The space-domain pattern is digitized into the binary data A2a_bin, A2b_bin. There is another method for obtaining binary data, in which the white noise pattern WH is filtered by a spatial filter having a certain pattern frequency in a space-domain and the space-domain pattern is digitized into the binary pattern. In this case, the spatial filter is a mask filter in which filter coefficients are arranged. Thus, a mask process is conducted, that is, each pixel value (0 or 1 in this embodiment) of the white noise pattern WH is weighted by each of the filter coefficients of the mask filter while the white noise pattern WH is scanned by the mask filter. By such a mask process, the space-domain data A2$a$, A2$b$ of the continuous-tone image shown in FIGS. 4C, 5C can be obtained. Finally, the binary data A2$a$_bin, A2$b$_bin can be generated by digitizing the space-domain data A2$a$, A2$b$.

In practice, various pattern frequency bandpass filters 34 having desirable characteristics can be prepared for another output system 22, or for certain images to be printed. For example, any set of maximum and minimum intensities can be chosen, e.g., 0.6 and 0.0; or 0.7 and 0.2, respectively, though in the graphs shown in FIGS. 4B and 5B, the maximum and minimum intensities are 1.0 and 0.0, respectively. Also, any intensity distribution can be set other than the rectangular or sinusoidal intensity distribution (function).

In this embodiment, the binary data A2$a$_bin, A2$b$_bin shown in FIGS. 4D, 5D will be used as dot candidate positions.

Then, in step S3, the number Dn of dots of a minimum size (also referred to as the number of dots of a new minimum size dots or the number of new dots of a minimum size) to be newly set at a present dot percentage is determined with respect to the dot percentage for which a dot pattern has been determined. The number Dn(P) of new dots of a minimum size to be established at each dot percentage P % is expressed as Dn(P)=Ds(P)−Ds(P−1) where Ds(P) represents the number of accumulated dots (accumulated values) at each dot percentage P %.

Specifically, in step S3, when candidate positions for dots are successively determined as the dot percentage is incremented, the number Dn(P) of dots of a minimum size to be newly established at a present dot percentage P is determined with respect to the preceding dot percentage P−1 for which a dot pattern has already been determined.

When a dot pattern has a dot percentage P with respect to the size N×N of a threshold matrix TM, the total number of blackened pixels in the dot pattern corresponding to the size N×N of the threshold matrix TM is calculated as N×N×P/100. If all the dots of a dot pattern comprise only dots of a minimum size as 2×2 (n=4)-pixel dots, then since the number of new dots of a minimum size at each dot percentage P is expressed as Ds(P)=(N×N×P/100)/n, it is given as (N×N×P/100)/n (n=4), as indicated by a solid straight curve na in FIG. 6, for example.

At this time, the number Dn(P) of dots of a minimum size to be newly established at this dot percentage P is expressed as Dn(P)=Ds(P)−Ds(P−1)=(N×N/100)/n.

The vertical axis of the graph shown in FIG. 6 represents a calculated accumulated value Ds of the number Dn of dots of a minimum size to be newly established (the number of new dots). Actually, as the dot percentage P becomes greater than 25%, since adjacent dots of a minimum size become closer to each other, the actual number of dots in a dot pattern is smaller than the accumulated value Ds of the number Dn of new dots shown in FIG. 6.

If the number Dn of new dots are determined at each dot percentage according to the solid straight curve na in FIG. 6 which represents the accumulated value of the number Dn of new dots, then the threshold matrix produces a conventional FM screen, which causes disadvantages in that a dot gain tends to become large and images are reproduced unstably when images are printed or films are output in an intermediate printing process.

According to an embodiment of the present invention, in view of the fact that the pattern frequency is low in highlight areas HL where the dot percentage is less than 10%, all dots comprise dots of a minimum size in those highlight areas HL. In intermediate tone areas where the dot percentage ranges from 10% to 50%, the size of dots is increased from the minimum size, e.g., dots composed of 5 pixels (2×2+1) or more are used. Specifically, in a dot percentage range from 10% to 25%, the number Dn of new dots to be established at each dot percentage is gradually reduced, as indicated by a broken-line curve nc which represents the accumulated value of the number of new dots. In a dot percentage range from 25% to 50%, the number Dn of new dots to be established at each dot percentage is set to zero. Alternatively, the number Dn is gradually increased, as indicated by the dot-and-dash-line curve nb which represents the accumulated value of the number of new dots.

In the present embodiment, since the output resolution R of the output system 22 is 100 pixels/mm or 10 μm/pixels, and the pattern frequency r of the intermediate tone dot pattern is r=20 c/mm, each side of the N×N-pixel area has to contain 20 blackened dots (one dot comprises 2×2 pixels with r c/mm) of a minimum size, each composed of 4 pixels per 100 pixels/mm (R pixels/mm). In terms of the size of the N×N-pixel threshold matrix TM, the accumulated value Ds of the number Dn of new dots up to the intermediate tone areas is represented by $(N/(R/r))^2 = N \times N \times (r/R)^2 = N \times N \times (20/100)^2 = N \times N \times 0.04$.

With the above settings, in the intermediate tone areas where the dot percentage ranges from 10% to 50%, the total number of pixels of a dot pattern generated by the threshold matrix TM at each dot percentage is the same as with the conventional FM screens, i.e., the dot percentage is the same, but the number of dots is smaller than with the conventional FM screens. Therefore, a periphery length representing the sum of the lengths of the peripheries of all the dots of the dot pattern is smaller than with the conventional FM screens.

Figure 7A:
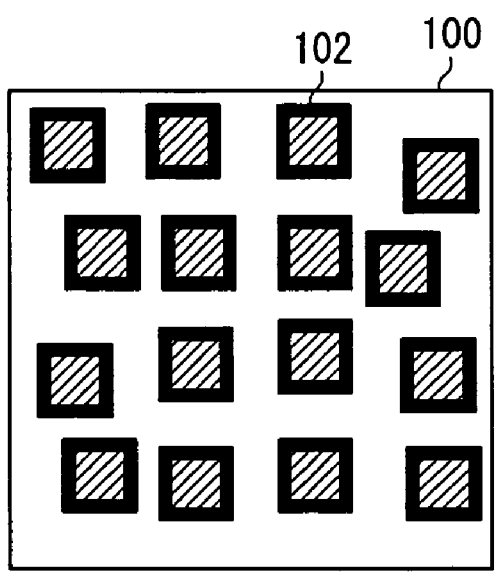
FIG. 7A is a diagram showing a periphery length of small dots.
Figure 7B:
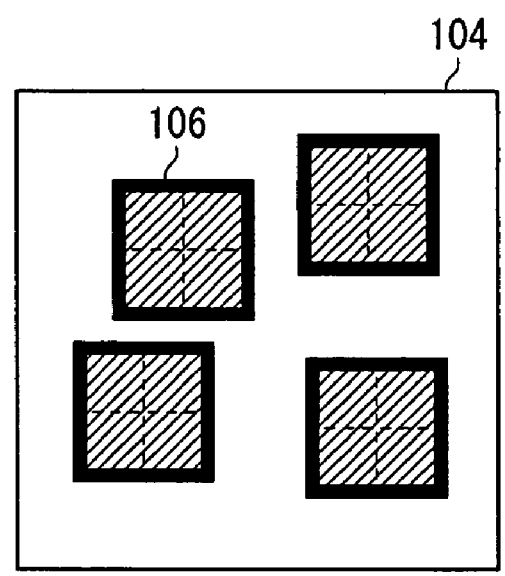
FIG. 7B is a diagram showing a periphery length of large dots at the same dot percentage as with FIG. 7A.

In the present description, the periphery length, for example, as can be seen from dot patterns 100, 104 having the same area shown in FIGS. 7A and 7B, the dot pattern 100 contains sixteen 1×1-pixel dots 102. The dot pattern 104 contains four 2×2-pixel dots 106. Though the total area of the dots 102 of the dot pattern 100 and the total area of the dots 106 of the dot pattern 104 are the same as each other, the dot patterns 100, 104 have different periphery lengths. Stated otherwise, though the dot pattern 100 and the dot pattern 104 have the same dot percentage, the sum of the lengths of white/black boundaries per unit area of the dot pattern, i.e., the dot periphery length of the dot pattern 100, is twice as long as the periphery length of the dot pattern 104. Specifically, the dot periphery length of the dot pattern 100 is calculated as 16 (dots)×4=64 while the dot periphery length of the dot pattern 104 is calculated as 4 (dots)×8=32.

If the relationship of the accumulated value Ds of the number Dn of dots with respect to the dot percentage is established according to the curve nc, then an increase in the dot gain in the intermediate tone areas is made smaller than with an FM screen where the accumulated value Ds is established according to the curve na.

In the dot percentage range from 50% to 100%, the accumulated value Ds of the number Dn of new dots may be established according to a curve which is in symmetric relation to the curves nc, nb with respect to the vertical line at the dot percentage of 50%. In the dot percentage range from 50% to 100%, the curve is analyzed from 100% toward 50%, and the number of new dots of white pixels (2×2 white pixels) is considered rather than the number Dn of new dots of blackened pixels.

A process of determining thresholds th alternately successively in ascending and descending orders in the highlight area HL and the shadow area SD in step S4 will be described below with reference to a flowchart shown in FIG. 8. For the sake of brevity, the process of successively determining thresholds th in the highlight area HL will mainly be described below. In the shadow area SD, the same process of successively determining thresholds th is carried out.

In step S11, the initial values of thresholds th_hl {0 through (thmax−1)/2} in the highlight area (0% through 50%) and thresholds th_sd {thmax through (thmax−1)/2} in the shadow area (100% through 50%) are determined to be th_hl=0, th_sd=thmax, respectively.

Figure 8:
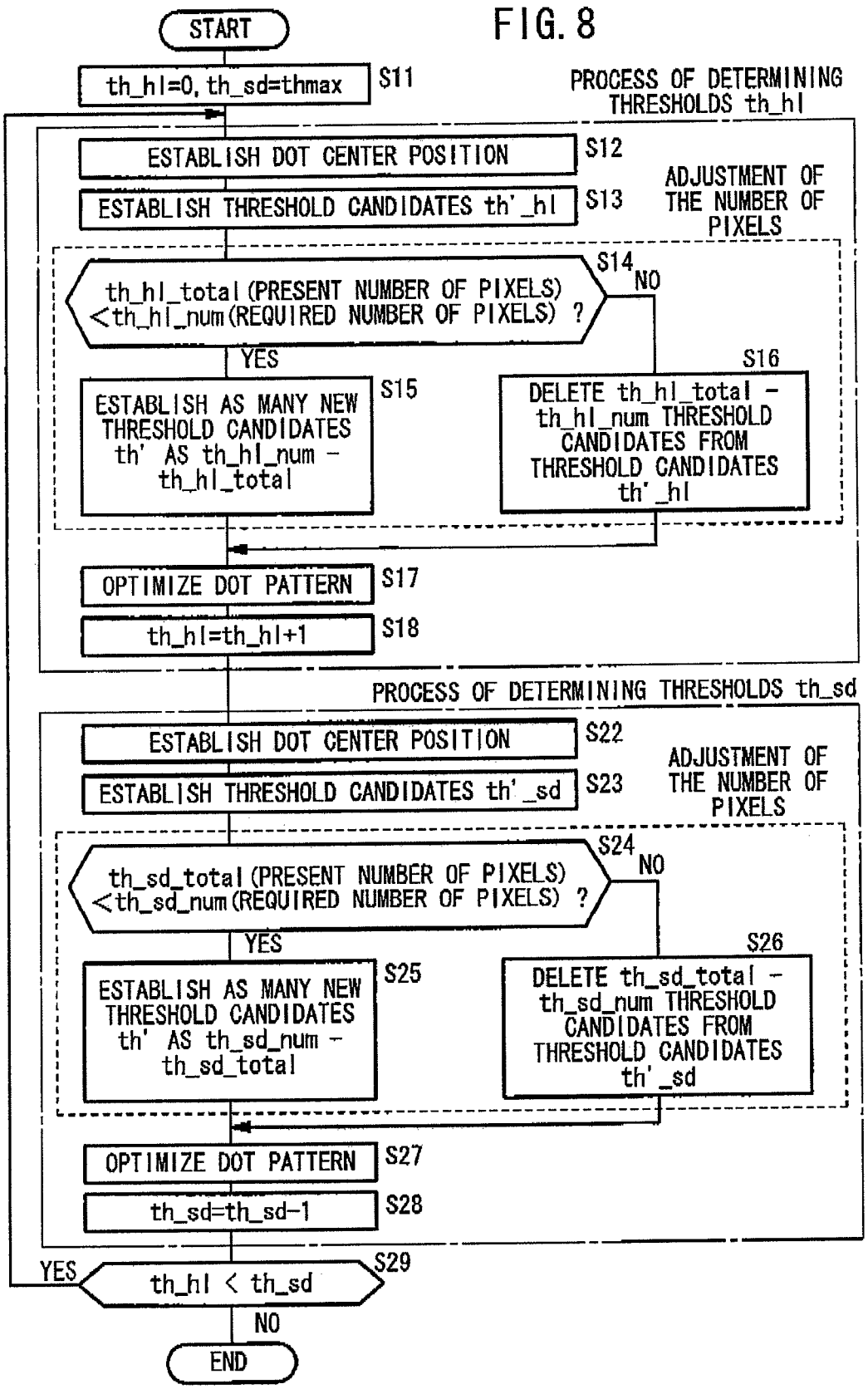
FIG. 8 is a flowchart of a detailed sequence of a threshold position determining process in step S4 of the overall sequence shown in FIG. 2.

In the flowchart shown in FIG. 8, positions (array) for placing all thresholds th up to the dot percentage of 50% are determined in the order of threshold 0→threshold thmax→threshold 1→threshold thmax−1→ . . . →threshold (thmax−1)/2.

For determining an array (placement positions) of thresholds th_hl in the highlight area, dot center positions are established in step S12. In step S12, dot center positions of the number Dn of new dots determined in step S3 for the dot percentages, among the dot candidate positions in the highlight area HL of the blackened portion (region) of the binary data A2a_bin (see FIG. 4D, or FIG. 5D if the binary data A2b_bin are used) determined in step S2, are established.

As described in Japanese Laid-Open Patent Publication No. 8-265566, the dot center positions are determined such that the dots established (assigned) by the thresholds th_hl whose placement positions are to be determined in the present threshold matrix TM are established in positions most spaced from the presently existing dots determined by the thresholds th_hl−1 for the preceding gradation where the placement positions of the thresholds th in the threshold matrix TM have already been determined.

For a better understanding, the process will be described with reference to FIG. 9 which shows a super-threshold matrix STM made up of nine threshold matrixes TM1 through TM9 each having 25 thresholds. When positions for placing thresholds are determined in an ascending order from the highlight areas HL of the threshold matrixes TM or in a descending order from the shadow areas SD thereof, central positions of newly placed thresholds th_hl are determined such that the already determined positions for placing thresholds th ("1" in FIG. 9) and the positions for newly placing thresholds th_hl ("2" in FIG. 9) are most spaced from each other in the threshold matrixes TM including a central threshold matrix (a 5×5 threshold matrix in FIG. 9) TM5 and other threshold matrixes TM1 through TM4, TM6 through TM9 of the same threshold layout which are disposed around the central threshold matrix TM5 as nine nearby threshold matrixes in FIG. 9.

Figure 9:
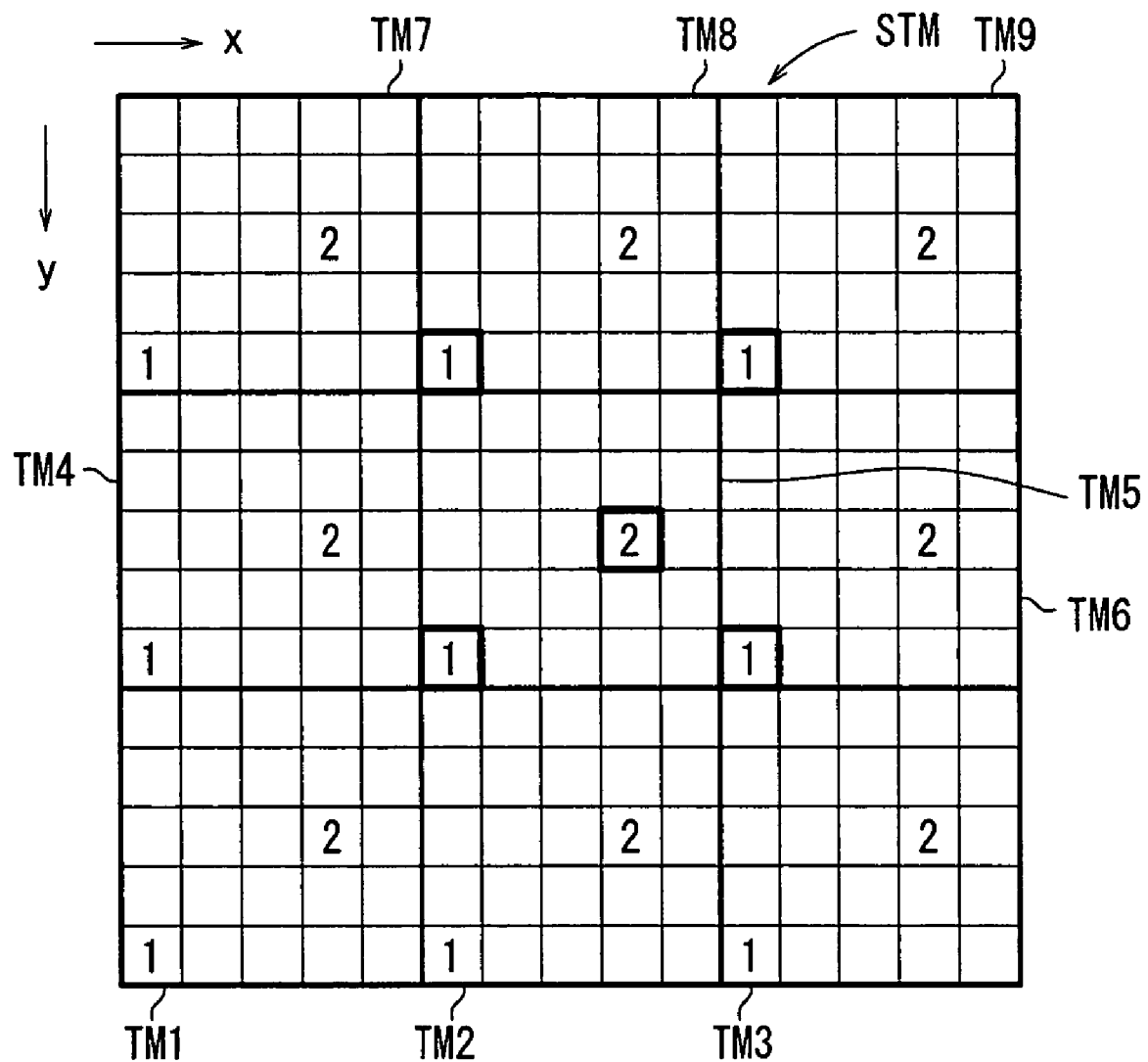
FIG. 9 is a diagram illustrative of a process of determining a threshold position for a next gradation.

In the example shown in FIG. 9, the central threshold "2" in a thick-line frame which is disposed within the threshold matrix TM5 is placed in either a position which contains a point contacted by four circles around respective four thresholds "1" in thick-line frames positioned around the central threshold "2" or a position which is closest to the above position and represents a blackened portion of the binary data A2a_bin (see FIG. 4D, or FIG. 5D if the binary data A2b_bin are used).

Figure 10A:
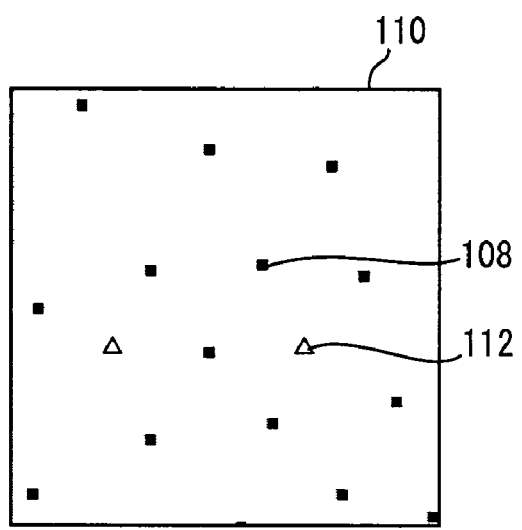
FIG. 10A is a diagram showing threshold candidate positions.

Specifically, as shown in FIG. 10A, positions 112 marked with Δ, for example, in a dot pattern 110 which is made up of dots 108 based on the thresholds th determined up to present are determined as central positions for placing dots.

Then, in step S13, candidates (threshold candidates) th'_hl for positions for placing thresholds are established. In this case, 2×2 (n=4)-pixel dots of a minimum size determined in step S1 around the central positions for placing dots which are determined in step S12 are established (placed), and used as candidates for placing new thresholds, i.e., threshold candidates th'_hl.

Figure 10B:
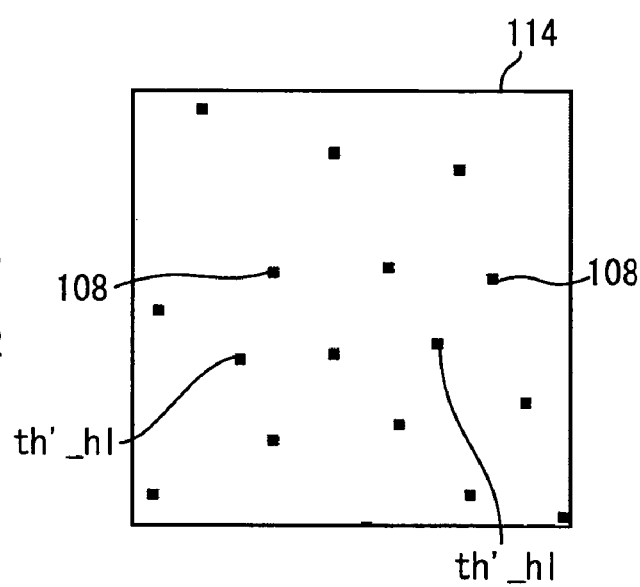
FIG. 10B is a diagram showing smallest-size dots placed in the threshold candidate positions.

Specifically, as shown in FIG. 10B, the threshold candidates th'_hl for the 2×2 (n=4)-pixel dots are set in the dot placing positions 112 marked with Δ in FIG. 10A, thus producing a dot pattern 114.

Then, in steps 14 through S16, it is determined whether the total number of pixels of a dot pattern generated by the threshold matrixes TM where the layout of the thresholds th is determined up to present, corresponds to the present dot percentage or not, thereby correcting the total number of pixels. The dot pattern is generated as follows: The image data generator 12 generates continuous-tone image data (image data I for generating a screen tint) of a gray pattern (whose pixel values are the same) corresponding to the dot percentage. The comparator 16 compares the generated continuous-tone image data with the threshold matrixes TM stored in the threshold matrix storage unit 14 and including thresholds up to the threshold th−1 which have been determined up to present. Binary data H produced from the comparator 16 are supplied to the dot pattern generator 18, which produces dot pattern data Ha. A dot pattern based on the dot pattern data Ha is displayed on the display unit 20b or the like.

In step S14, it is determined whether a present pixel count th_hl_total which is the sum of the total number of pixels based on the thresholds 0 through th−1 whose placement positions have already been determined and the total number of pixels based on newly established threshold candidates th'_hl, is smaller than a required pixel count th_hl_num=N× N×th/thmax required at the present dot percentage or not (th_hl_total<th_hl_num).

If the present pixel count th_hl_total is smaller than the required pixel count th_hl_num, then since it is necessary to add as many pixels as the difference (th_hl_num−th_hl_total) which is produced by subtracting the present pixel count th_hl_total from the required pixel count th_hl_num, new threshold candidates th' are established as dots for adding those pixels from the binary data A2a_bin, A2b_bin in step S15.

If the present pixel count th_hl_total is greater than the required pixel count th_hl_num, then since it is necessary to delete as many pixels as the difference (the present pixel count th_hl_total−the required pixel count th_hl_num), dots for deleting those pixels are selected and deleted from the dots based on the newly established threshold candidates th'_hl in step S16.

In step S16, of the dots making up the dot pattern, several dots may possibly be smaller than dots of a minimum size. In the present embodiment, because the dots of a minimum size are 2×2-pixel dots, the total number of pixels of the dot pattern which is made up of the dots of a minimum size is a multiple of 4. If the total number of dots is adjusted in order to equalize dot percentages, 3-pixel dots, 2-pixel dots, or 1-pixel dots, which are produced by deleting one, two, or three pixels from each of 2×2-pixel dots, may be necessary.

In step S15, as disclosed in Japanese Laid-Open Patent Publication No. 2001-292317, a dot pattern (binary image data) in the spatial domain, which is made up of the dots based on the thresholds 0 through th−1 whose placement positions have already been determined and the dots based on the newly established threshold candidates th'_hl is FFTed into a dot pattern in the frequency domain by the FFT unit 32, after which high frequencies in the dot pattern are cut off by an LPF (Low-Pass Filter) 40. Then, the dot pattern is IFFTed back into a dot pattern in the spatial domain by the IFFT unit 36, after which low-frequency components are extracted from the dot pattern. Positions where the extracted low-frequency components are weakest are set to threshold candidates th' to be added. However, if a dot pattern having a dot percentage of 50% is established in step S2, then positions where the low-frequency components are weakest within blackened pixels of the dot pattern having the dot percentage of 50% may be set to threshold candidates th' to be added.

A process of extracting positions where low-frequency components are weakest will be described below in greater detail. When a dot pattern is FFTed into a dot pattern in the frequency domain, since frequency components present in the repetitive frequency of the threshold matrix TM are noise components (low-frequency components), the dot pattern is filtered by the LPF 40 to extract the low-frequency components.

Since the noise components are perceived by the human being, the low-frequency components are extracted by a human visual characteristic filter 42, used as the LPF 40, which for example has a sensitivity level of 0 at a spatial frequency of 0 c/mm, a maximum sensitivity level of 1 in the vicinity of a spatial frequency of 0.8 c/mm, a sensitivity level of about 0.4 at a spatial frequency of 2 c/mm, and a sensitivity level of about 0 at a spatial frequency in the range from 6 to 8 c/mm. A model of human visual frequency characteristics is described in detail in "Design of minimum visual modulation halftone patterns" written by J. Sullivan, L. Ray, and R. Miller, IEEE Trans. Syst. Man Cybern., vol. 21, No. 1, 33-38 (1991).

Then, the low-frequency components extracted by the LPF 40 are IFFTed into low-frequency components in the spatial domain by the IFFT unit 36. Because the produced low-frequency components have intensity variations, an image made up of these low-frequency components and the positions of the threshold candidates th' in the threshold matrix TM are compared with each other, and positions where the low-frequency components are weakest (the values are smallest) are set to threshold candidates th'_hl.

In the shadow area SD, positions where the low-frequency components are strongest (the values are greatest) may be set to threshold candidates th'_sd.

In step S16, low-frequency components may similarly be extracted, and pixels may be deleted from dots in positions where the low-frequency components are strongest (the values are greatest), of the new threshold candidates th'_hl. In the shadow area SD, pixels may be deleted from dots based on the new thresholds th'_sd in positions where the low-frequency components are weakest (the values are smallest).

FIG. 11A shows a dot pattern 120 having a dot percentage of 30% where the dots of a minimum size are 2×2-pixel dots, according to the present embodiment, the dot pattern 120 being generated by the above process starting from the binary data A2a_bin in FIG. 4D. FIG. 11C shows a dot pattern 122 of the conventional 2×2-pixel dot FM screen.

FIGS. 11B and 11D show dot patterns 124, 126, respectively, with dark and light areas which are produced by processing the dot patterns 120, 122 with the visual characteristic filter 42 used as the LPF 40. It can be seen that the dot pattern 120 shown in FIG. 11A according to the present embodiment has smaller intensity variations in the dark and light areas and hence smaller amplitudes than the conventional dot pattern 122 shown in FIG. 11C.

In step S15 or S16, as disclosed in Japanese Laid-Open Patent Publication No. 2002-368995, when the dot pattern is IFFTed by the IFFT unit 36 to produce the low-frequency components in the spatial domain, the low-frequency components may further be FFTed by the FFT unit 32, and particular frequency components may be extracted in a descending intensity order by a particular frequency component extractor 44. The extracted particular frequency components may be IFFTed in a descending intensity order to produce images in the spatial domain, and positions where intensity components are weakest, of the positions which do not intensify these images, may be set to threshold candidates th' or threshold candidates th'_hl.

According to the above processing in steps S12 through S16, a predetermined number of thresholds th may be established on the threshold matrix TM corresponding to positions where dots are newly assigned on the dot pattern.

In step S17, the dot pattern generated by the determined thresholds th is optimized. This process of optimizing the dot pattern is not required if a high-quality dot pattern has been generated by the processing up to step S16.

The process of optimizing the dot pattern may be either one or both of the method disclosed in Japanese Patent No. 3400316 and the process disclosed in Japanese Laid-Open Patent Publication No. 2002-369005.

Specifically, according to the method disclosed in Japanese Patent No. 3400316, low-frequency components are extracted from the dot pattern generated by the thresholds th_hl. Of the extracted low-frequency components, pixels that are placed in positions where the intensity is strongest and pixels that are placed in positions where the intensity is weakest are switched around such that the former pixels will be white pixels and the latter pixels will be blackened pixels, thereby reducing the intensities of the low-frequency components. The blackened pixels have to be pixels attached to the periphery of dots, i.e., pixels held in contact with the periphery of dots, and the threshold th of the blackened pixels is of value equal to the threshold th of the dots.

According to the process disclosed in Japanese Laid-Open Patent Publication No. 2002-369005, as with the process disclosed in Japanese Laid-Open Patent Publication No. 2002-368995, the dot pattern generated by the thresholds th is FFTed, thereafter filtered by the visual characteristic filter 42 and the LPF 40, and then IFFTed into low-frequency components in the spatial domain. The low-frequency components are FFTed to extract frequency components in a descending intensity order. The extracted particular frequency components are IFFTed in a descending intensity order to produce images in the spatial domain, and pixels in positions where intensity components are weakest, of the positions which do not intensify these images and pixels that are placed in positions where the intensity components are strongest are extracted and switched around, thereby reducing the intensities of the low-frequency components. The extracted pixels have to be pixels attached to the periphery of dots, and the threshold th of the blackened pixels is of value equal to the threshold th of the dots.

In the process of extracting low-frequency components in steps S14 through S17, as disclosed in Japanese Laid-Open Patent Publication No. 2002-369005, a density image corresponding to a dot pattern output from an image output apparatus may be simulated, i.e., predicted, by a density image simulator (predictor) 46, and low-frequency components may be extracted from the density image. In this case, a test pattern is actually output from the output system 22, and the density image simulator 46 measures how one dot of the original dot pattern is output on the test pattern with dark and light areas, thereby calculating the dot percentage of a density image close to an actual density image from the dot pattern.

An amount of exposure is integrally calculated from the shape of the laser beam used in the output system 22, and a density image is predicted from the gamma characteristics of the photosensitive material on the printing plate materials EM.

The prediction of a density image based on calculations will be described in detail below. A simulation shape for computer calculations of a laser beam for forming 1×1-pixel dots, 2×2-pixel dots, . . . on a recording medium such as a film F or the like is determined. The laser beam has a shape close to the Gaussian distribution which can substantially be expressed using a beam diameter that is determined by the maximum value $1/e^2$ of the amplitude. The amount of exposure for each dot is calculated from the laser beam and the dot pattern.

Then, the amounts of exposure for the respective dots, i.e., 1×1-pixel dots, 2×2-pixel dots, are converted into densities of the dots using the exposure characteristics, i.e., the gamma characteristics, of the photosensitive material such as a film or the like. A density image (density-simulated image) is obtained from the densities of the dots thus determined. Low-frequency components can be extracted from the density image according to the above process using FFT. Actually, low-frequency components that are extracted from a density image can often be more effective to remove noise components, rather than low-frequency components extracted from a dot pattern.

In this manner, the positions of thresholds th_hl in the threshold matrix are determined.

Then, in step S18, the newly established thresholds th_hl are set to thresholds th_hl+1 for the next gradation (th_hl=th_hl+1).

Similarly, thresholds th_sd for the shadow area SD are determined in steps S22 through S28.

In step S29, the thresholds th_hl determined from the highlight area HL and the thresholds th_sd determined from the shadow area SD are compared with each other for magnitude, and thresholds th_hl and thresholds th_sd are determined until they are of the same value, i.e., until the dot percentage of 50% is achieved. When thresholds th_hl and thresholds th_sd are of the same value, the generation of the threshold matrix is finished.

Figure 12C:
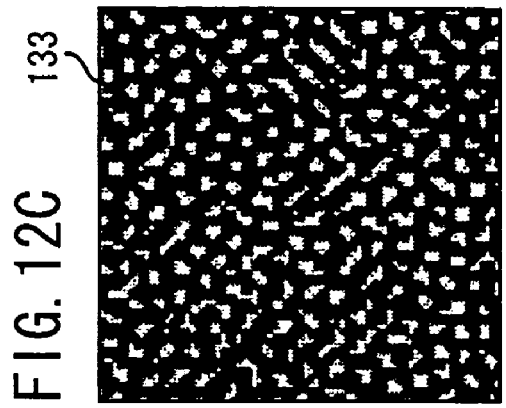
FIG. 12C is a diagram showing a dot pattern obtained by overlaying the dot pattern for the C-separation and the dot pattern for the M-separation according to the present embodiment.
Figure 12B:
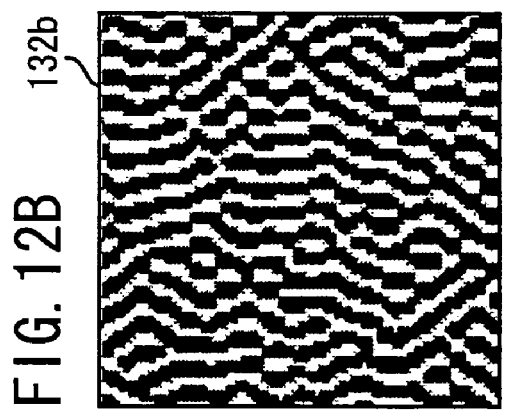
FIG. 12B is a diagram showing a dot pattern for an M-separation according to the present embodiment.
Figure 12A:
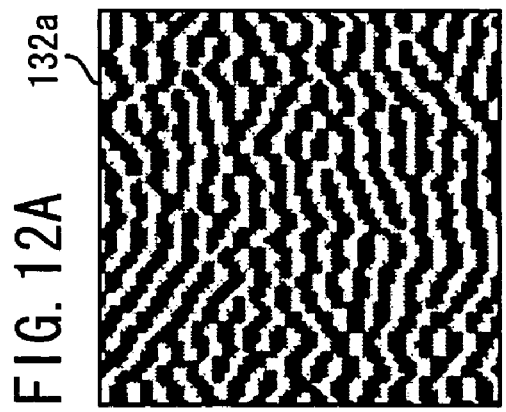
FIG. 12A is a diagram showing a dot pattern for a C-separation according to the present embodiment.

FIG. 12A illustrates a dot pattern 132*a* in the space-domain for a C-separation having a dot percentage of 50%. The dot pattern 132*a* is obtained by the comparator 38 through the comparison between a threshold matrix TMa for a C-separation and the central gradation value (e.g., 127 if the maximum gradation is 255). The threshold matrix TMa is generated for a desired C-separation from the binary data A2_bin. Also, FIG. 12B illustrates a dot pattern 132*b* in the space-domain for an M-separation having a dot percentage of 50%. The dot pattern 132*b* is obtained by the comparator 38 through the comparison between a threshold matrix TMb for an M-separation and the central gradation value (e.g., 127 if the maximum gradation is 255). The threshold matrix TMb is generated for a desired M-separation from the binary data A2_bin.

Figure 30A:
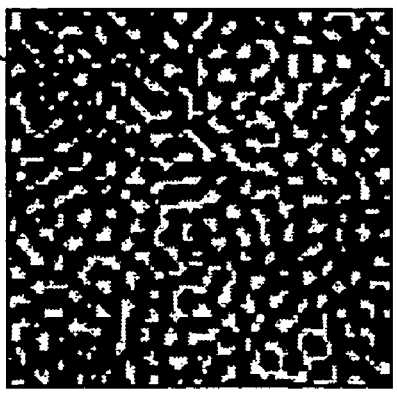
FIG. 30A is a diagram showing a conventional dot pattern for a C-separation according to conventional art.
Figure 30B:
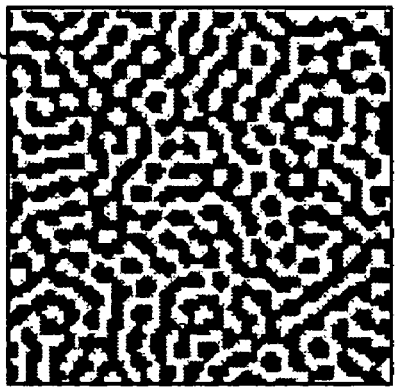
FIG. 30B is a diagram showing a dot pattern for an M-separation according to conventional art.
Figure 30C:
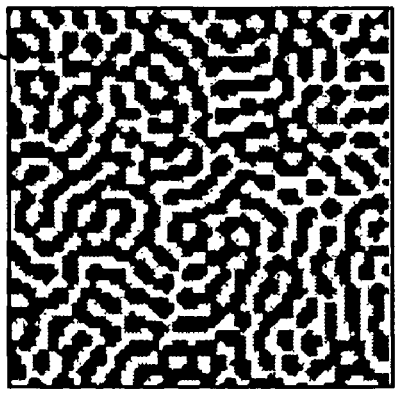
FIG. 30C is a diagram showing a dot pattern obtained by overlaying the dot pattern for the C-separation and the dot pattern for the M-separation according to conventional art.

FIG. 12C illustrates a dot pattern 133 in the space-domain for a color image, which is obtained by overlaying (superimposing) the dot pattern 132*a* for a C-separation and the dot pattern 132*b* for an M-separation. In the dot pattern 133 for a color image, it is understandable that the low frequency component, i.e., graininess is small in comparison with the conventional dot pattern 306 for a color image, as shown in FIG. 30C.

Figure 12F:
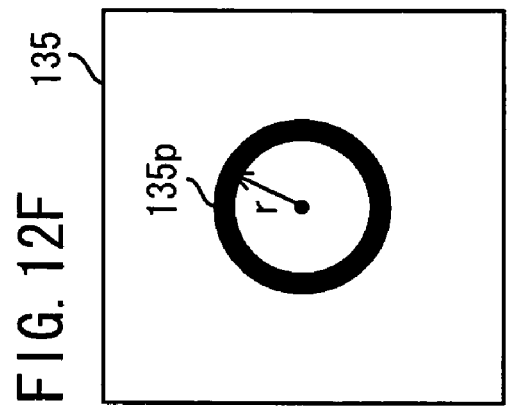
FIG. 12F is a diagram showing frequency-domain data of the dot pattern in FIG. 12C.
Figure 12E:
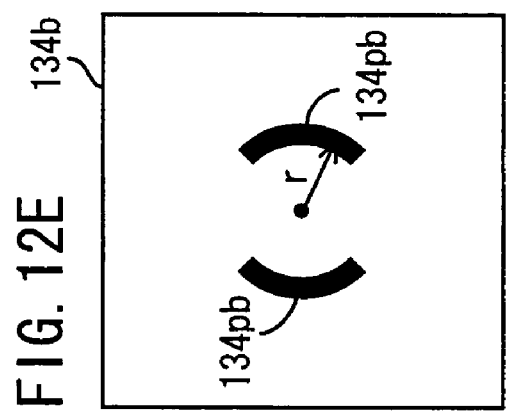
FIG. 12E is a diagram showing frequency-domain data of the dot pattern in FIG. 12B.
Figure 12D:
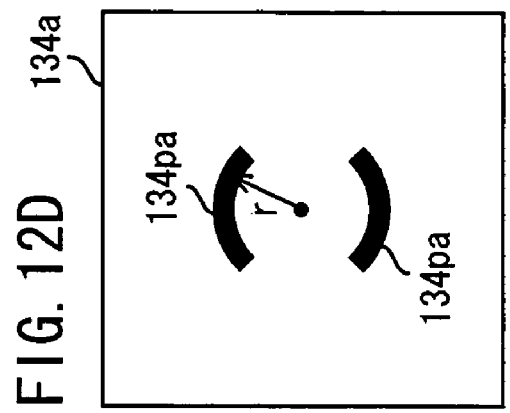
FIG. 12D is a diagram showing frequency-domain data of the dot pattern in FIG. 12A.

FIG. 12D illustrates frequency-domain data 134*a* obtained by the Fourier Transform of the dot pattern 132*a* for a C-separation. FIG. 12E illustrates frequency-domain data 134*b* obtained by the Fourier Transform of the dot pattern 132*b* for an M-separation. The frequency-domain data 134*a* have main frequency components 134*pa* at the pattern frequency r, and have distribution of the frequency components corresponding to the frequency-domain data AFFT2*a* shown in FIG. 4A (recognized as a pair of opposing circular arcs). Also, the frequency-domain data 134*b* have main frequency components 134*pb* at the pattern frequency r, and have distribution of the frequency components corresponding to the frequency-domain data AFFT2*b* shown in FIG. 5A (recognized as a pair of opposing circular arcs).

FIG. 12F illustrates frequency-domain data 135 of the dot pattern 133 shown in FIG. 12C.

As shown in the embodiment of FIGS. 12A through 12F, threshold matrixes for a C-separation and an M-separation are used to convert a continuous-tone image subjected to color separation (the C-separation and the M-separation) into dot patterns 132*a*, 132*b* for the C-separation and the M-separation. The dot patterns 132*a*, 132*b* are binary images in which no screen ruling or screen angle is defined. Then, a color image 133 is reproduced by overlaying the dot patterns 132*a*, 132*b* for the C-separation and the M-separation. When the dot patterns 132*a*, 132*b* for the C-separation and the M-separation are converted into patterns in the frequency domain, main frequency components 134*pa*, 134*pb* obtained by the conversion have a substantially-constant predetermined pattern frequency r for all angles θ, and the intensity distribution of the main frequency components 134*pa*, 134*pb* is varied based on the C-separation and the M-separation. That is, the main frequency components 134*pa* for the C-separation are prevented from being overlaid on the main frequency components 134*pb* for the M-separation.

Figure 30D:
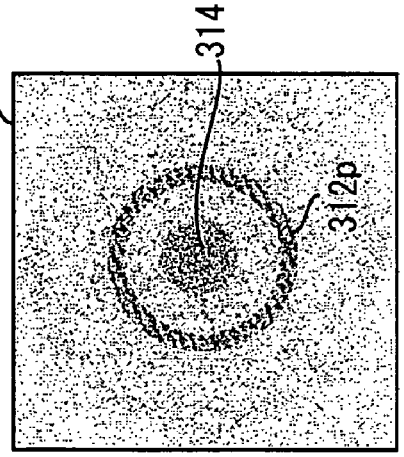
FIG. 30D is a diagram showing frequency-domain data of the dot pattern in FIG. 30A.
Figure 30E:
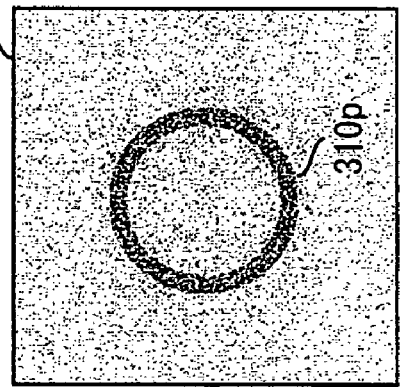
FIG. 30E is a diagram showing frequency-domain data of the dot pattern in FIG. 30B.
Figure 30F:
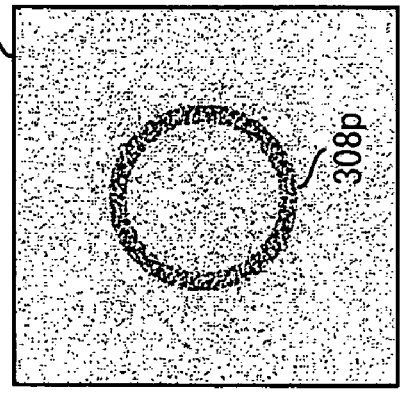
FIG. 30F is a diagram showing frequency-domain data of the dot pattern in FIG. 30C.

In the frequency-domain data 135 of the dot pattern 133 shown in FIG. 12C, a main frequency component 135*p* having an arc or partial ring shaped area at the pattern frequency r is found while a low-frequency component 314 positioned centrally (at and around the frequency component of zero (0)) in frequency-domain data 312 shown in FIG. 30F disappears. This corresponds to the fact that a low-frequency component is reduced, i.e., the graininess is small in the dot pattern 133, which is obtained by overlaying the dot pattern 132*a* for a C-separation and the dot pattern 132*b* for an M-separation as shown in FIG. 12C.

Figure 13A:
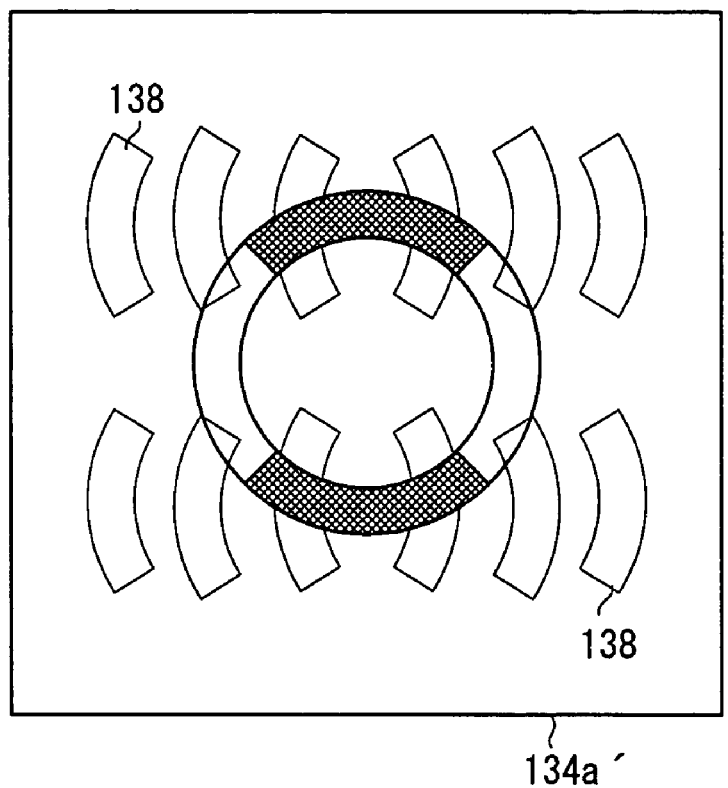
FIG. 13A is a diagram showing frequency-domain data in FIG. 12F in detail according to the present embodiment.

The reason why the low-frequency component 314 disappears will be described below with reference to FIG. 13A for this embodiment, and FIG. 13B for conventional art.

FIG. 30C illustrates a dot pattern 306, which is obtained by overlaying a dot pattern 302 and a dot pattern 304 in the space domain. The overlaying in the space domain is equivalent to the multiplication of amount of lights. In the frequency domain, the frequency-domain data shown in FIG. 30F can be calculated through the convolution operation of frequency-domain data 308 of the dot pattern 302 and frequency-domain data 310 of the dot pattern 304.

Figure 13B:
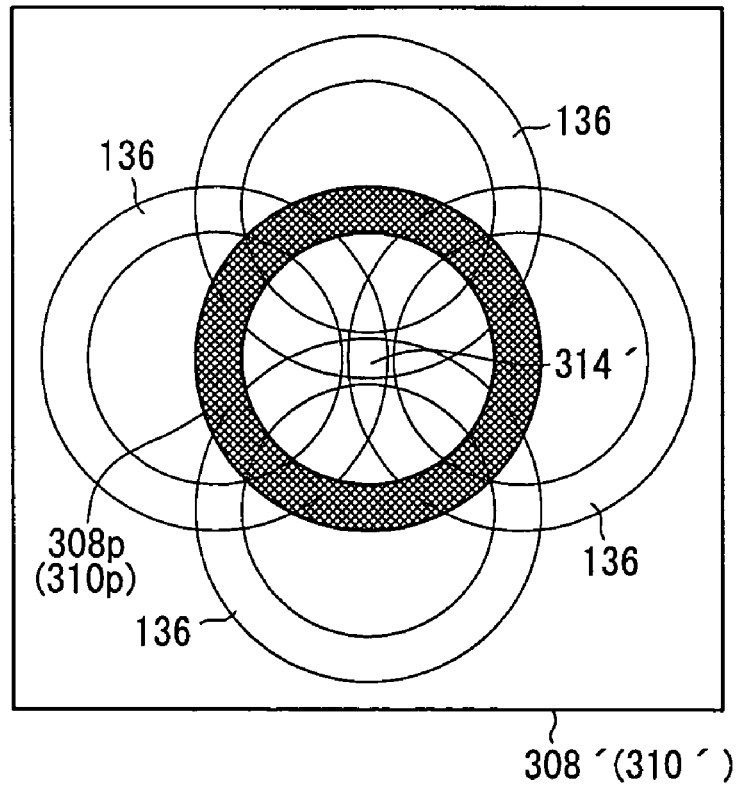
FIG. 13B is a diagram showing conventional frequency-domain data in FIG. 30F in detail.

When the main frequency components 308*p* and 310*p* having a circular ring shape shown in FIGS. 30D, 30E are convoluted, a low-frequency component 314' undesirably appears in frequency-domain data 308' and 310' as well as the main frequency components 308*p* and 310*p*, as shown in FIG. 13B. In the low-frequency component 314', all aliasing noise components 136 are overlaid at and around the frequency component of zero. The low-frequency component 314' is recognized as the graininess (low-frequency noise) in an image when color separations are overlaid.

In this embodiment, in contrast, frequency component 134a' in FIG. 13A corresponding to the frequency-domain data 134a in FIG. 12D will be explained below, for example. Aliasing noise components 138 are not generated at and around the frequency component of zero through the convolution operation since there is no frequency component at the same position (frequency, angle) including positions at and around the frequency component of zero. Thus, even if the dot patterns for color separations are overlaid, the graininess in an image resulting from the low-frequency component is remarkably reduced and hardly recognized at all.

In the above-mentioned embodiment, a threshold matrix TM is generated for producing each of color separations. The threshold matrix TM converts a continuous-tone image subjected to color separation into a dot pattern for each of the color separations. A color image is reproduced by overlaying the dot patterns, and each of the dot patterns is a binary image in which no screen ruling or screen angle is defined. A pattern frequency r is determined at a predetermined dot percentage of an intermediate tone. A white noise pattern WH is filtered with the pattern frequency bandpass filter 34 having a different characteristic for each of the color separations, and thereafter the filtered patterns are digitized for obtaining binary patterns A2a_bin, A2b_bin. A dot candidate position for placing a dot in a dot pattern is determined based on the obtained binary patterns A2a_bin, A2b_bin to obtain an array of the threshold th. The pattern frequency bandpass filter 34 has a main frequency of a bandpass characteristic that is substantially same as the pattern frequency r, and intensity distribution of the bandpass characteristic is modulated based on the angles θ. Also, the intensity distribution of the bandpass characteristic for the angles θ is varied based on each of the color separations. Therefore, the graininess in a color image can be reduced when the color image is reproduced by overlaying a plurality of color separations each of which is a dot pattern of a binary image where no screen ruling or screen angle is defined.

Figure 14B:
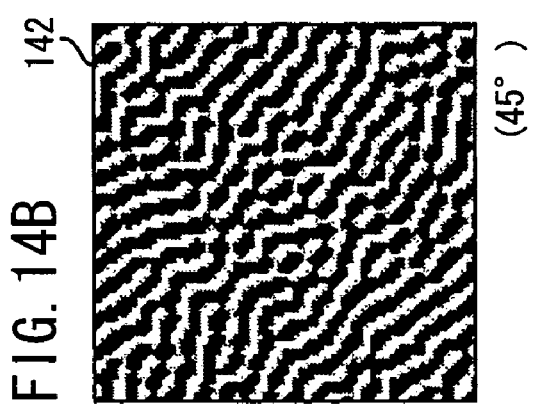
FIG. 14B is a diagram showing a dot pattern for the M-separation in a direction of 45°.
Figure 14D:
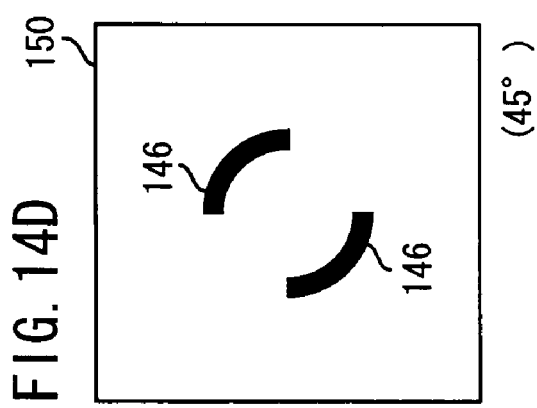
FIG. 14D is a diagram showing frequency-domain data of the dot pattern in FIG. 14B.
Figure 14A:
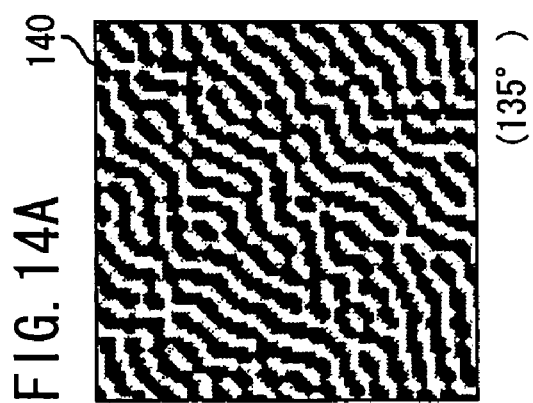
FIG. 14A is a diagram showing a dot pattern for the C-separation in a direction of 135°.
Figure 14C:
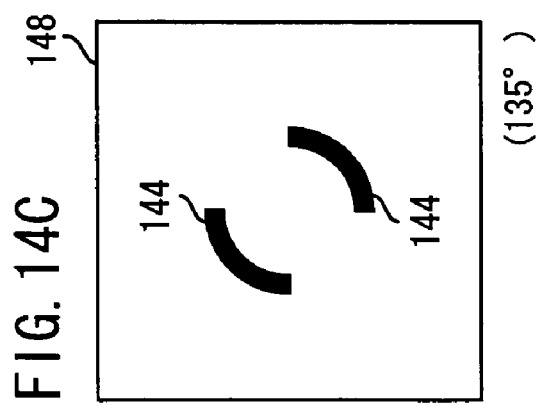
FIG. 14C is a diagram showing frequency-domain data of the dot pattern in FIG. 14A.

When the dot pattern is generated as a two-dimensional scanning image in the main and auxiliary scanning directions MS and AS, it is preferable that frequency-domain data 148, 150 having the following features are obtained. In the frequency-domain data 148, 150, a dot pattern 140 for a C-separation in FIG. 14A and a dot pattern 142 for an M-separation shown in FIG. 14B are different depending on the color separation, and intensity distributions of the bandpass characteristic for angles of main frequency components 144 in FIG. 14C and main frequency components 146 in FIG. 14D are different depending on the color separation. In FIGS. 14A, 14C for a C-separation, intensity is high in a direction of 135°. In FIGS. 14B, 14D for an M-separation, intensity is high in a direction of 45°. At the same time, in the frequency-domain data 148, 150, it is preferable that the dot pattern and the intensity distributions are not present or are weakened in the scanning directions (directions of 0° and 90°). According to the frequency-domain data 148, 150 thus featured, the two-dimensional scanning image may not be affected so much by the variation of the output system 22 as an outputting device of a scanning exposure system.

Further, since it is preferable that the dot pattern does not have any directional characteristic, the dot pattern may desirably have several peaks of intensity at plural angles. For example, for a C-separation, FIG. 15A illustrates a dot pattern 156 and FIG. 15C illustrates frequency-domain data 160. The dot pattern 156 has components in a direction of 67.5° and a direction of 157.5° which is perpendicular to the direction of 67.5°, and the frequency-domain data 160 has main frequency components 152 in the directions of 67.5° and 157.5°.

Figure 15B:
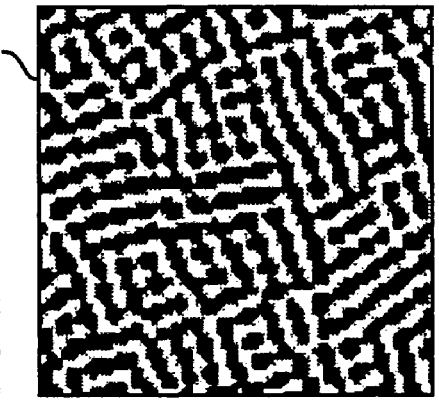
FIG. 15B is a diagram showing a dot pattern for the M-separation in directions of 22.5° and 112.5°.
Figure 15D:
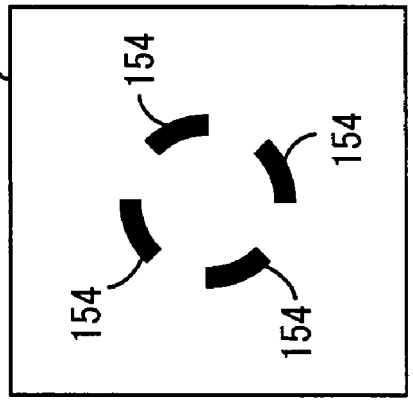
FIG. 15D is a diagram showing frequency-domain data of the dot pattern in FIG. 15B.
Figure 15A:
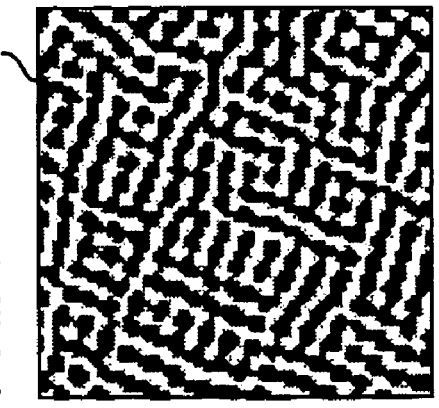
FIG. 15A is a diagram showing a dot pattern for the C-separation in directions of 67.5° and 157.5°.
Figure 15C:
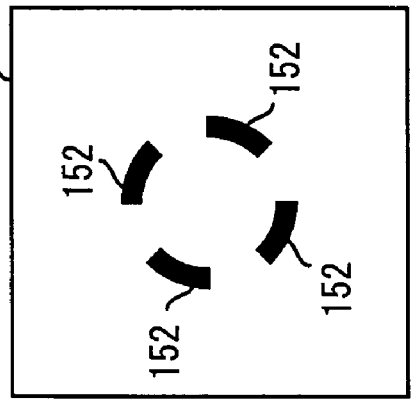
FIG. 15C is a diagram showing frequency-domain data of the dot pattern in FIG. 15A.

For an M-separation, FIG. 15B illustrates a dot pattern 158 and FIG. 15D illustrates frequency-domain data 162. The dot pattern 158 has components in a direction of 22.5° and a direction of 112.5° which is perpendicular to the direction of 22.5°, and the frequency-domain data 162 has main frequency components 154 in the directions of 22.5° and 112.5°. It is preferable that the intensity distribution of the bandpass characteristic for angles of frequency components are divided equally such that several peaks of intensity are not overlaid, as the dot patterns 156, 158 and the frequency-domain data 160, 162 shown in FIGS. 15A through 15D.

Figure 16A:
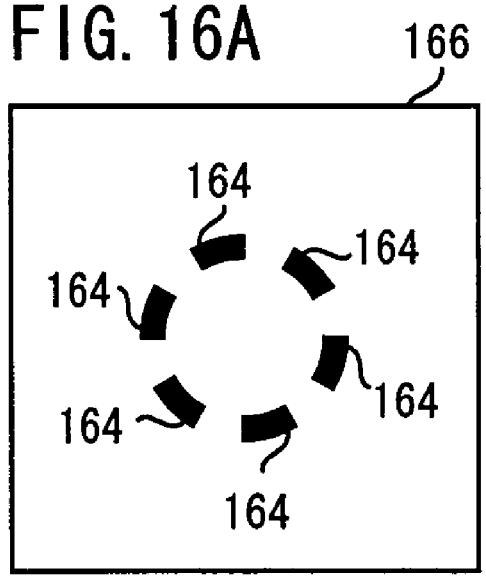
FIG. 16A is a diagram showing frequency-domain data for the C-separation with six main frequency components.
Figure 16B:
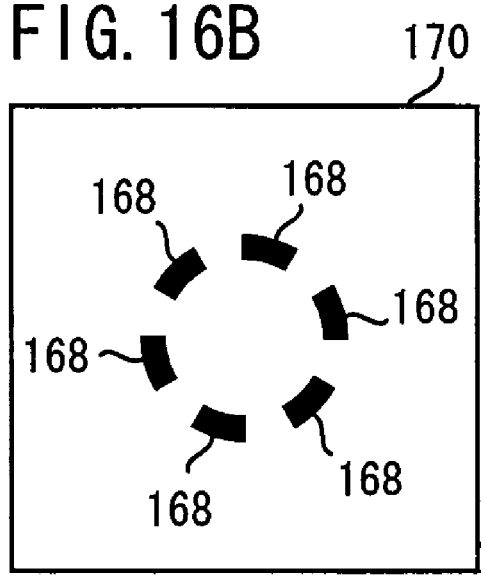
FIG. 16B is a diagram showing frequency-domain data for the M-separation with six main frequency components.
Figure 17A:
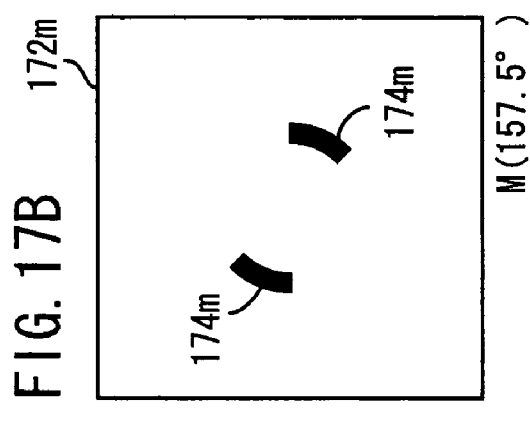
FIGS. 17A through 17D are diagrams showing frequency-domain data for the C-separation, the M-separation, a Y-separation, a K-separation, respectively, with main frequency components spaced equiangularly.
Figure 17B:
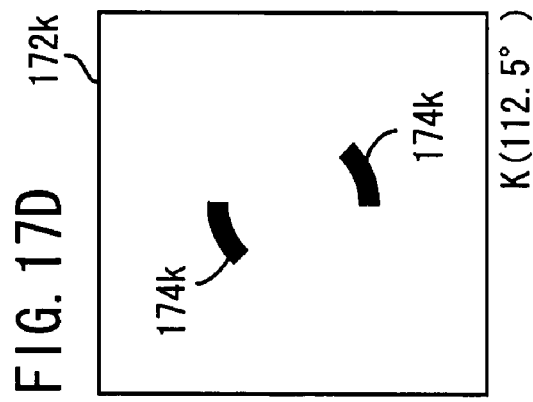
Figure 17C:
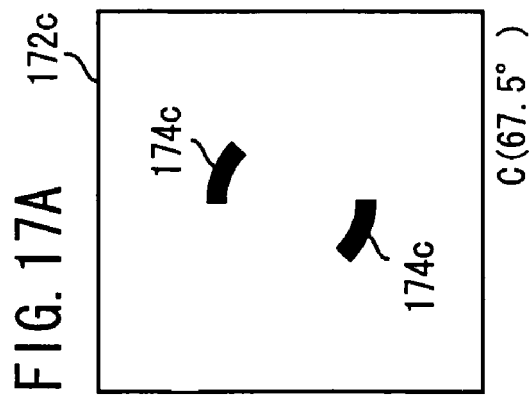
Figure 17D:
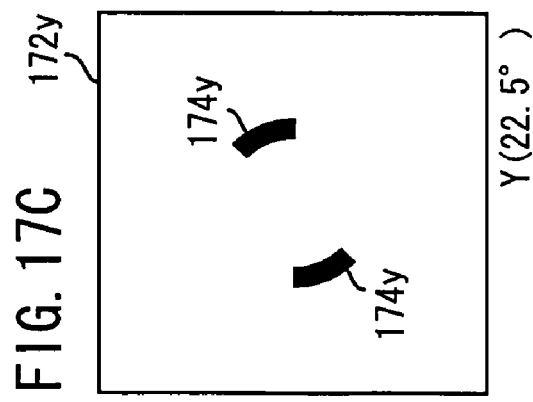
Figure 18A:
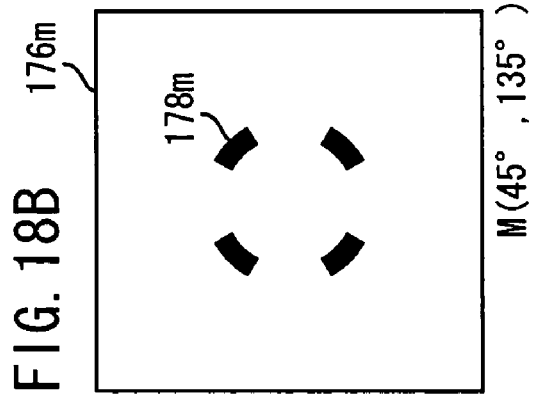
FIGS. 18A through 18D are diagrams showing other frequency-domain data for the C-separation, the M-separation, a Y-separation, a K-separation, respectively.
Figure 18B:
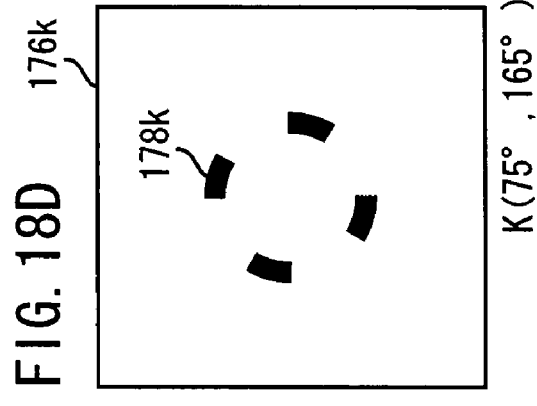
Figure 18C:
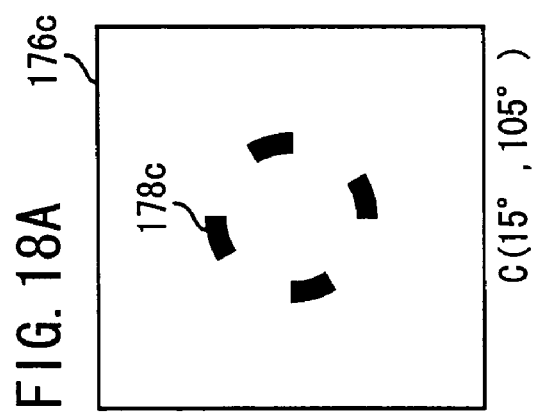
Figure 18D:
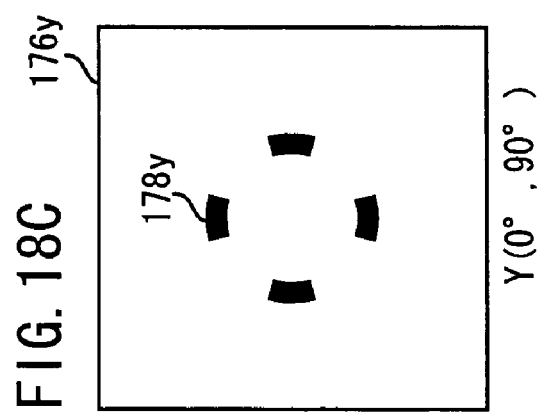

For another example, FIG. 16A illustrates frequency-domain data 166 for a C-separation and FIG. 16B illustrates frequency-domain data 170 for an M-separation, both with more main frequency components. The frequency-domain data 166 has six main frequency components 164 in the directions of 45°, 105° and 165°. Correspondingly, the frequency-domain data 170 has six main frequency components 168 in the directions of 15°, 75° and 135°, in which several peaks of intensity are not overlaid. If too many main frequency components are provided, frequency characteristics tend to approximate to the characteristics of a circular ring, which is not preferable. At most twelve main frequency components are preferable.

Meanwhile, a color image is often made by using four separations of CMYK. In view of this, another preferable example is shown in FIGS. 17A through 17D. Frequency-domain data 172c has two main frequency components 174c for a C-separation in a direction of 67.5°. Frequency-domain data 172m has two main frequency components 174m for an M-separation in a direction of 157.5°. Frequency-domain data 172y has two main frequency components 174y for a Y-separation in a direction of 22.5°. Frequency-domain data 172k has two main frequency components 174k for a K-separation in a direction of 112.5°. Accordingly, in the main frequency components 174c, 174m, 174y, 174k, the intensity distributions of the bandpass characteristic for angles of frequency components are shifted by 45°, respectively.

The combination shown in FIGS. 17A through 17D is indicated as: (C, M, Y, K)=(67.5°, 157.5°, 22.5°, 112.5°).

Then, another combination in which frequency components are shifted by 45° may be: (C, M, Y, K)=(45°, 135°, 0°, 90°).

Further, another combination in which four kinds of frequency components are provided may be realized by shifting the frequency components by 22.5°: (C, M, Y, K)=[(22.5°, 112.5°),(45°, 135°), (0°, 90°), (67.5°, 157.5°)].

In this indication, (22.5°, 112.5°) means that the frequency components are provided at 22.5° and 112.5°. To avoid any frequency component from being provided in the direction of 0°, another combination in which frequency components are shifted by 11.25° may be provided: (C, M, Y, K)=[(33.75°, 123.75°), (56.25°, 146.25°), (11.25°, 101.25°), (78.75°, 168.75°)].

A color image is often made by using four separations of CMYK, but a dot pattern for a Y-separation is less visually perceptible since it has low visibility. In view of this, frequency-domain data 176c, 176m, 176y, 176k as shown in FIGS. 18A through 18D are preferable, in which the intensity distributions of the bandpass characteristic for angles of frequency components are shifted by 45° for a C-separation, an M-separation and a K-separation, and are shifted by 15° for a Y-separation. The frequency-domain data 176c has four main frequency components 178c for a C-separation (15°, 105°). The frequency-domain data 176m has four main frequency components 178m for an M-separation (45°, 135°). The frequency-domain data 176y has four main frequency components 178y for a Y-separation (0°, 90°). The frequency-domain data 176k has four main frequency components 178k for a K-separation (75°, 165°).

To avoid any frequency component from being provided in the directions of 0° and 90°, another combination in which frequency components are shifted by 7.5° may be provided: (C, M, Y, K)=[(22.5°, 112.5°), (52.5°, 142.5°), (7.5°, 97.5°), (82.5°, 172.5°)].

If color separations, in which the intensity distributions of the bandpass characteristic for angles of frequency components are shifted, comprise the main color separations for CMYK and other auxiliary color separations, it is preferable that the frequency components are spaced equiangularly for the main CMYK-separations and the frequency components for the auxiliary color separations are provided between the equiangularly-spaced frequency components for the main CMYK-separations. Other auxiliary color separations may be R (red), G (green) and B (blue) (i.e., CMYKRGB-separations); or O (orange) and G (i.e., CMYKOG-separations); or LC (light cyan), LM (light magenta) and LK (light black) (i.e., CMYKLCLMLK-separations).

Some examples of the frequency component distribution are described hereinbefore where several angular components are provided in each frequency. In those examples, it is a main object to avoid generating a low-frequency component including the frequency component of zero in the convolution operation. Thus, extremely high angular precision may not be required.

Also, in the above embodiment, the pattern frequency bandpass filter (pattern frequency BPF) 34 is used. The pattern frequency bandpass filter 34 has a bandpass characteristic in which a main frequency (or center frequency) thereof is substantially same as the pattern frequency r. The intensity distribution of the bandpass characteristic is modulated based on angles θ. The intensity distribution of the bandpass characteristic for angles of frequency components is provided such that the intensity thereof is not overlaid. The characteristics of the pattern frequency bandpass filter 34 can be changed variously.

Figure 19:
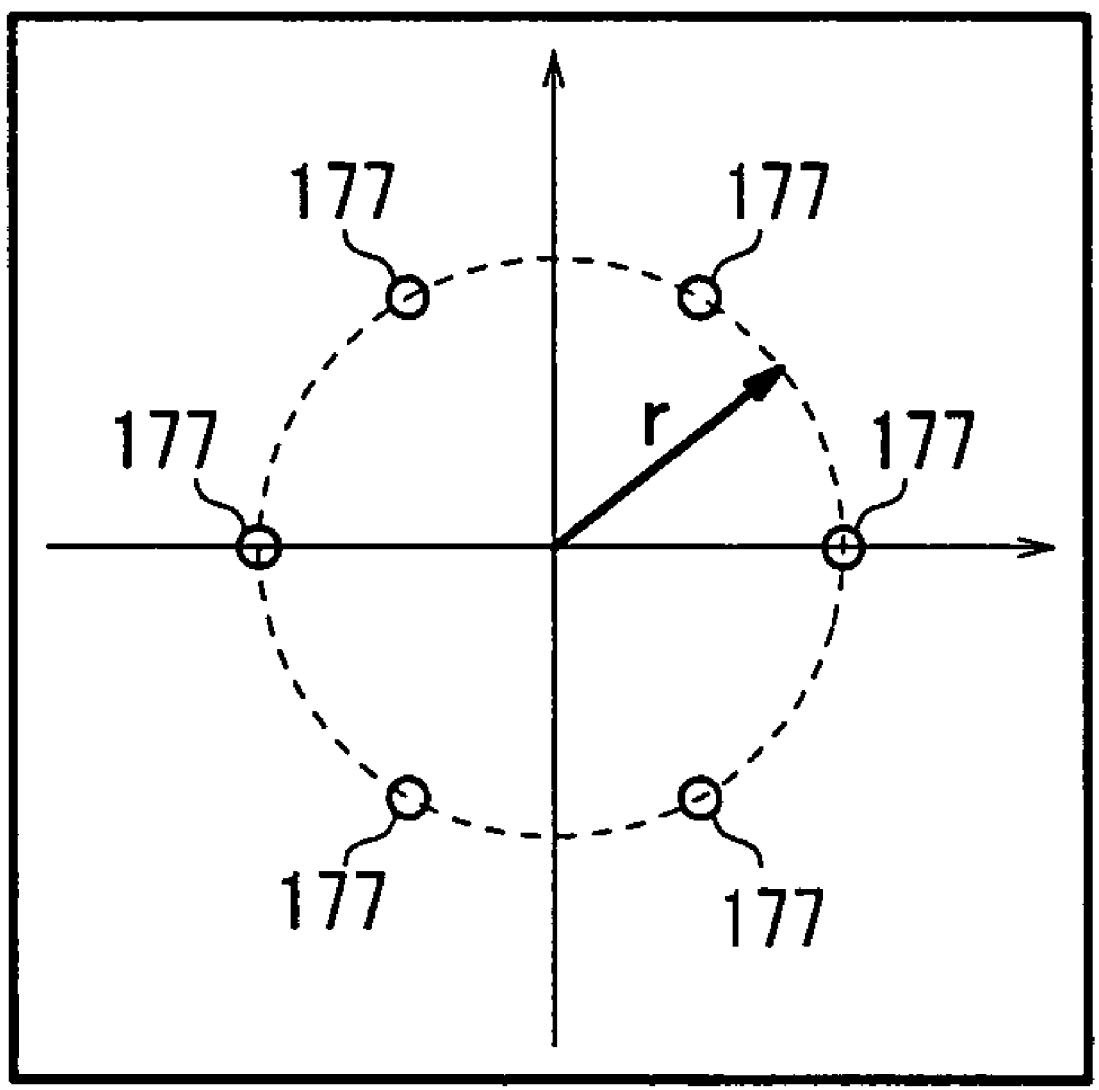
FIG. 19 is a diagram showing determined frequency angular component positions for another frequency bandpass filter.

In FIG. 19, for example, frequency angular component positions 177 in the frequency domain are shown, where six positions are shifted by 60°.

Figure 20:
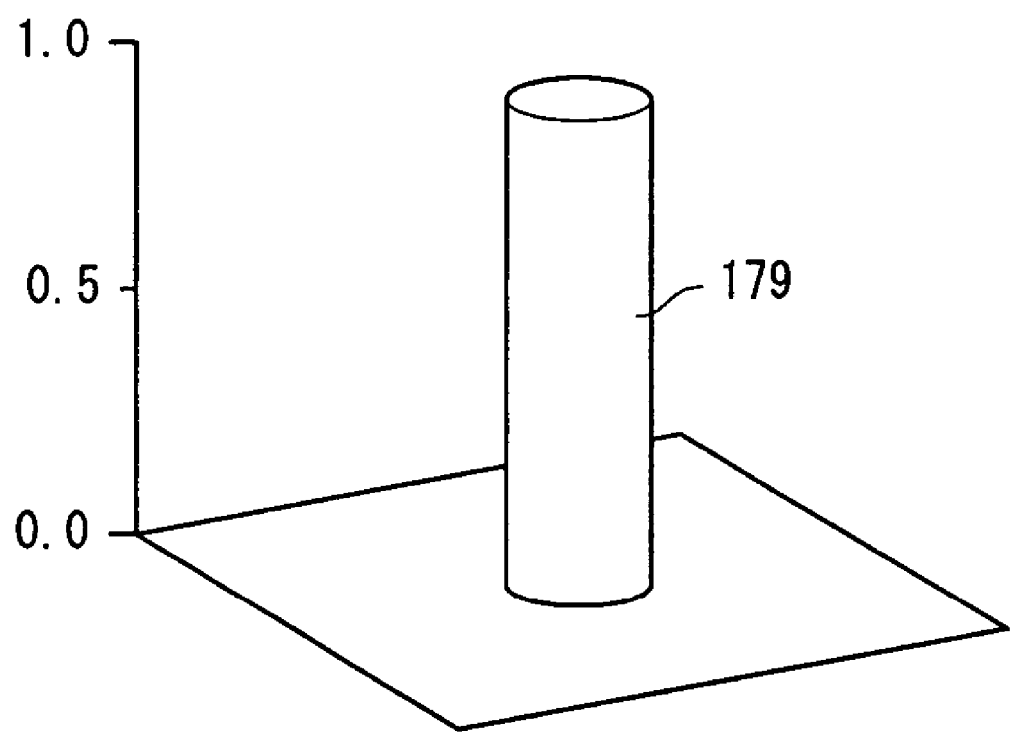
FIG. 20 is a diagram showing a columnar frequency bandpass filter applied to the determined frequency angular component positions.
Figure 21:
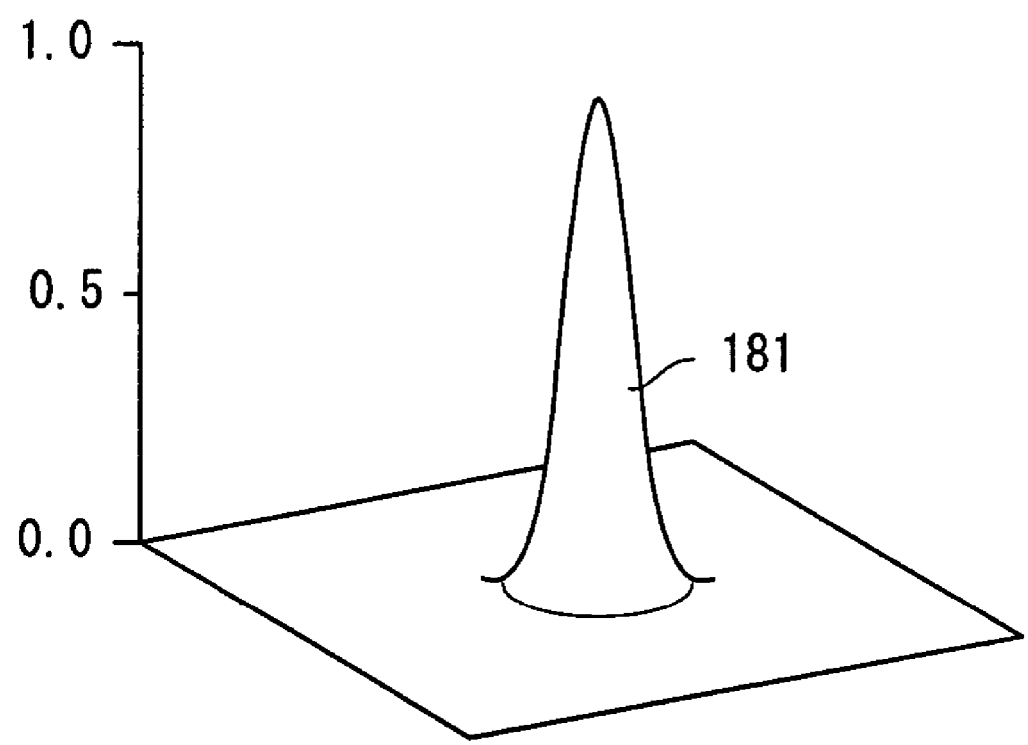
FIG. 21 is a diagram showing a Gaussian frequency bandpass filter applied to the determined frequency angular component positions.
Figure 22:
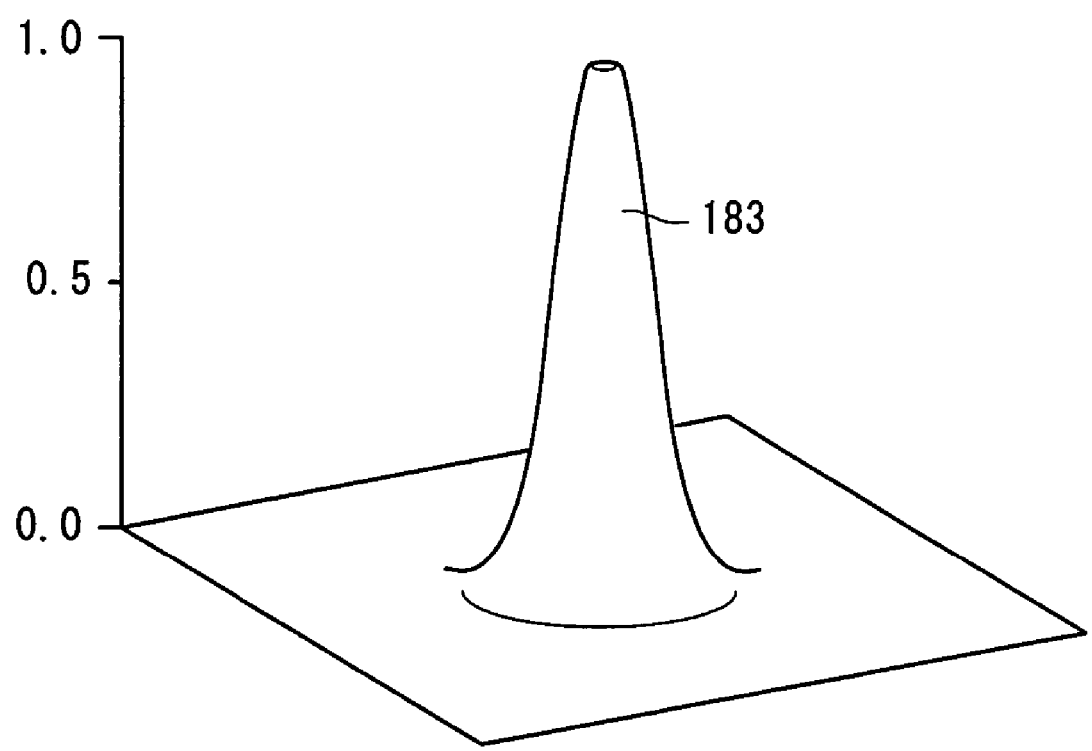
FIG. 22 is a diagram showing a visual characteristic frequency bandpass filter applied to the determined frequency angular component positions.
Figure 23A:
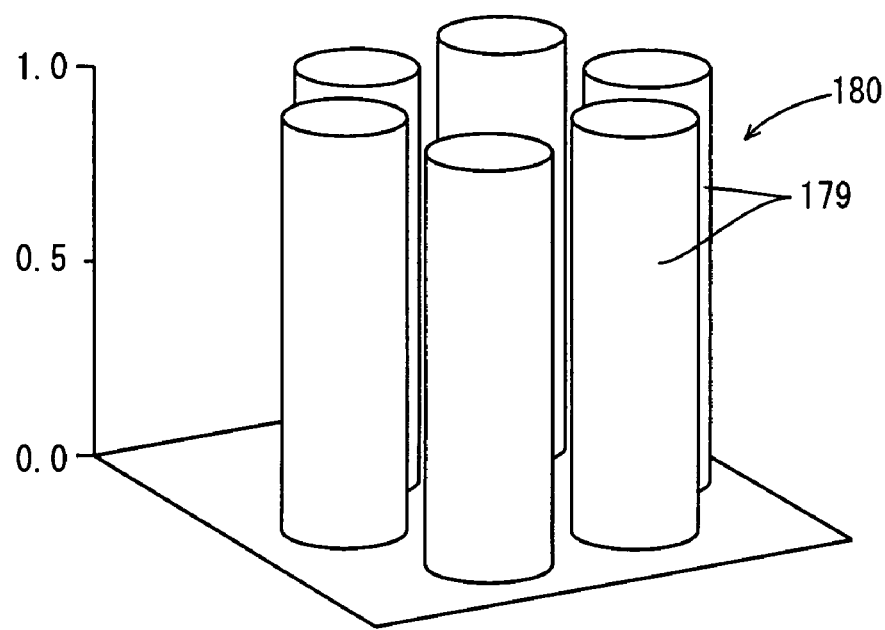
FIG. 23A is a diagram showing columnar frequency distribution arranged on the determined frequency angular component positions.
Figure 23B:
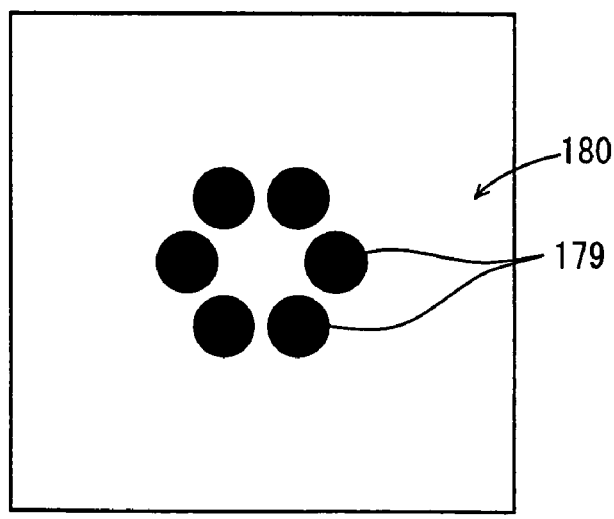
FIG. 23B is a diagram showing frequency distribution in FIG. 23A with dark and light areas.
Figure 24:
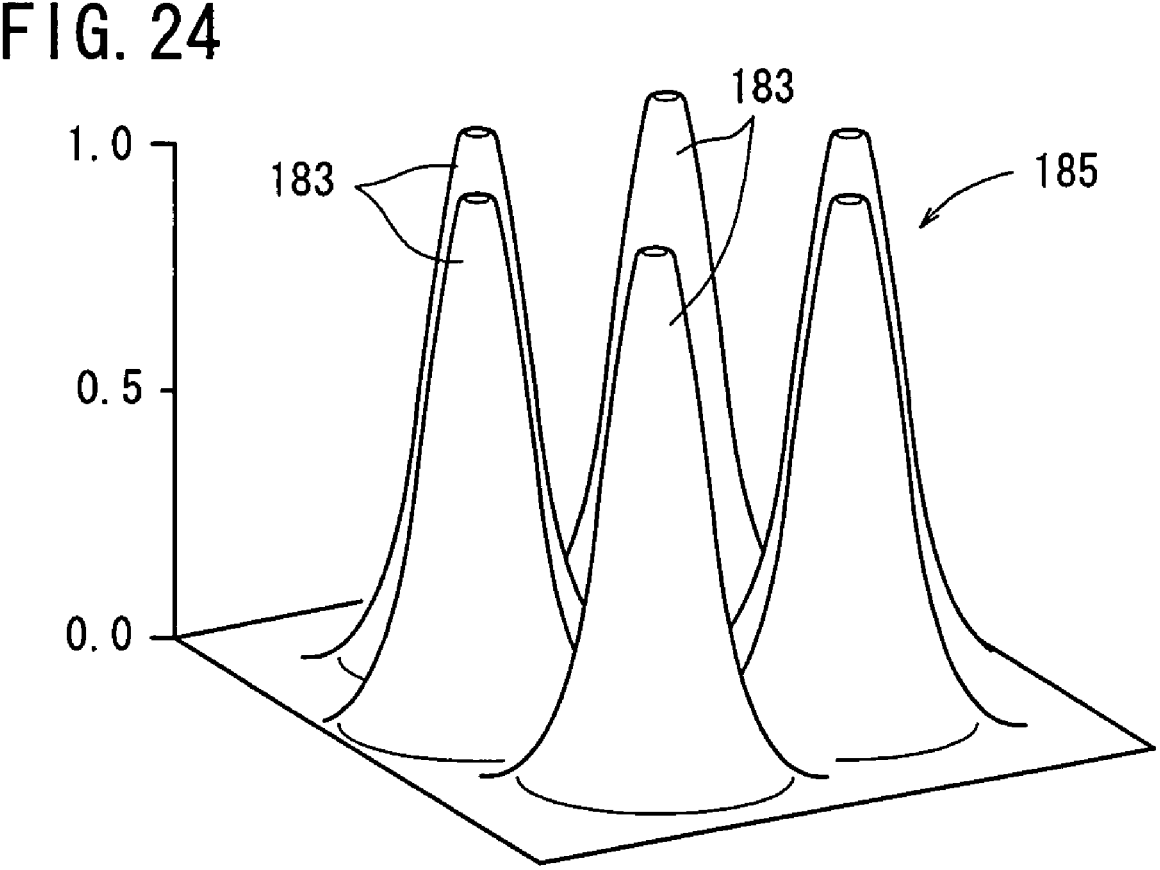
FIG. 24 is a diagram showing visual characteristic frequency distribution arranged on the determined frequency angular component positions.

In this case, the pattern frequency bandpass filter 34 can be obtained by the convolution operation on frequency distribution (columnar frequency distribution) 179 having columnar intensity shown in FIG. 20 with respect to a white noise pattern WH in the frequency domain, around each of the frequency angular component positions 177 determined in FIG. 19. For example, the columnar frequency distribution 179 is arranged on each of the frequency angular component positions 177 so that frequency distribution 180 shown in FIG. 23A may be obtained for the convolution operation. Alternatively, the pattern frequency bandpass filter 34 can be obtained with respect to a white noise pattern WH in the frequency domain, around each of the frequency angular component positions 177 determined in FIG. 19, by the convolution operation on: Gaussian frequency distribution 181 shown in FIG. 21; or visual characteristic frequency distribution 183 shown in FIG. 21. For example, the visual characteristic frequency distribution 183 is arranged on each of the frequency angular component positions 177 so that frequency distribution 185 shown in FIG. 24 may be obtained for the convolution operation. FIG. 23B illustrates the frequency distribution 180 in FIG. 23A with dark and light areas.

Figure 25A:
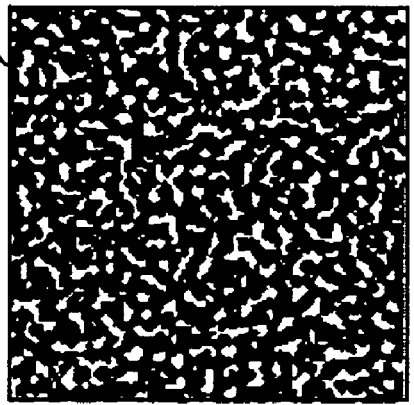
FIG. 25A is a diagram showing a dot pattern for a C-separation according to another embodiment.

FIG. 25A illustrates a dot pattern 184a for a C-separation in the space domain with the dot percentage of 50%. The dot pattern 184a is obtained by the comparator 38 comparing the threshold matrix TM for a C-separation with the central gradation value (e.g., 127 if the maximum gradation is 255). The threshold matrix TM for a C-separation is generated from binary data (not shown) filtered with the pattern frequency bandpass filter 34 having the frequency distribution 180 shown in FIGS. 23A, 23B.

Figure 25B:
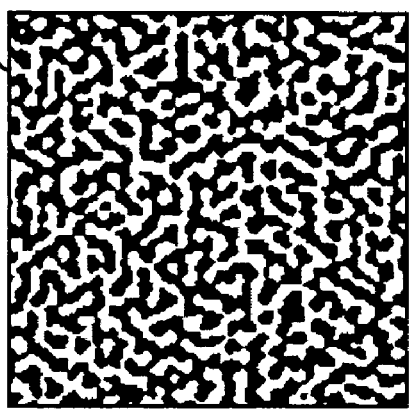
FIG. 25B is a diagram showing a dot pattern for an M-separation according to another embodiment.

Similarly, FIG. 25B illustrates a dot pattern 184b for an M-separation in the space domain with the dot percentage of 50%. The dot pattern 184b for an M-separation is obtained by the comparator 38 comparing the threshold matrix TM for an M-separation with the central gradation value (e.g., 127 if the maximum gradation is 255). The threshold matrix TM for an M-separation is generated from binary data (not shown) filtered with the pattern frequency bandpass filter 34 having the distribution where the columnar frequency distribution 179 shown in FIGS. 23A, 23B is rotated by 30°.

Figure 25C:
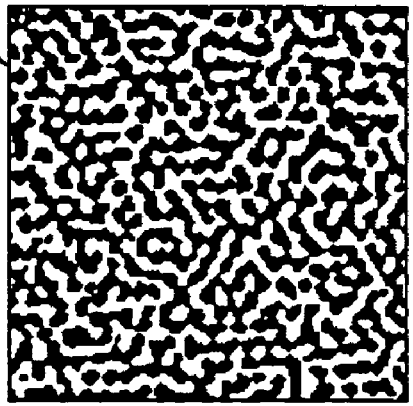
FIG. 25C is a diagram showing a dot pattern obtained by overlaying the dot pattern for the C-separation and the dot pattern for the M-separation according to another embodiment.

FIG. 25C illustrates a dot pattern 186 for a color image in the space domain in which the dot pattern 184a for a C-separation and the dot pattern 184b for an M-separation are overlaid. When the dot pattern 186 for a color image is compared with the conventional dot pattern 306 for a color image in FIG. 30C, it is understandable that a low-frequency component is reduced, i.e., the graininess is small.

Figure 25D:
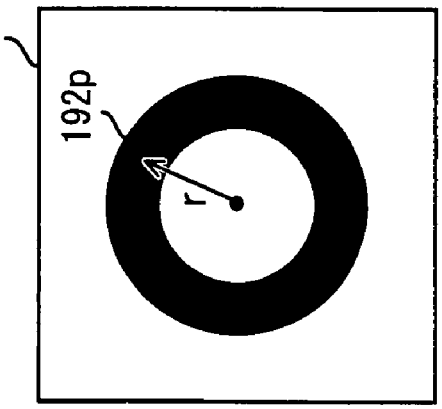
FIG. 25D is a diagram showing frequency-domain data of the dot pattern in FIG. 25A.
Figure 25E:
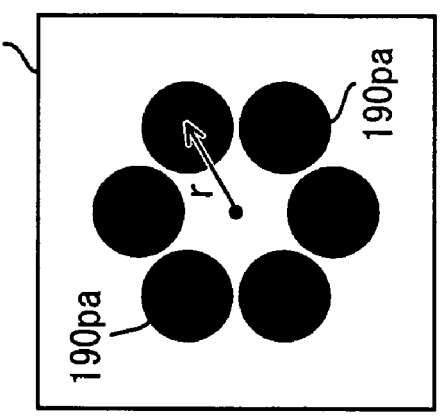
FIG. 25E is a diagram showing frequency-domain data of the dot pattern in FIG. 25B.

FIG. 25D illustrates frequency-domain data 190a obtained by the Fourier Transform of the dot pattern 184a in FIG. 25A. FIG. 25E illustrates frequency-domain data 190b obtained by the Fourier Transform of the dot pattern 184b in FIG. 25B. The frequency-domain data 190a has main frequency components 190pa with the pattern frequency r, and the frequency-domain data 190b has main frequency components 190pb with the pattern frequency r.

Figure 25F:
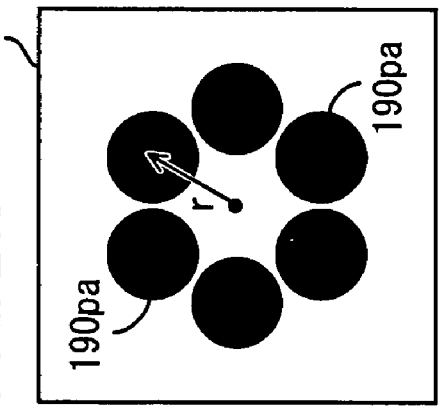
FIG. 25F is a diagram showing frequency-domain data of the dot pattern in FIG. 25C.

FIG. 25F illustrates frequency-domain data 192 obtained by the Fourier Transform of the dot pattern 186 in FIG. 25C.

The frequency-domain data 192 has a ring-shaped main frequency component 192p. Thus, it is understandable that a low-frequency component is reduced centrally (at and around the frequency component of zero (0)). Therefore, it is understandable that the graininess in an image resulting from a low-frequency component is small.

In the above description, for reproducing color images, it is customary to employ a 7-color printing process including separated C, M, Y, K colors and R, G, B colors, or a 6-color printing process including C, M, Y, K colors, G color, and orange color. Though different threshold matrixes having m threshold matrix sizes may be generated with respect to m (m>4) colors, any interference between complementary colors is small as dot percentages for complementary colors are hardly increased. Therefore, a threshold matrix for a color may also be used for its complementary color. For example, when inks of C, M, Y, K colors and R, G, B colors are used, one threshold matrix may be used for M and G separations, one threshold matrix for C and R separations, and one threshold matrix for Y and B separations. Similarly, when inks of C, M, Y, K colors, G color, and orange color are used, one threshold matrix may be used for M and G separations, and one threshold matrix for C and orange separations.

Threshold matrixes thus generated may be used as follows.

Figure 26:
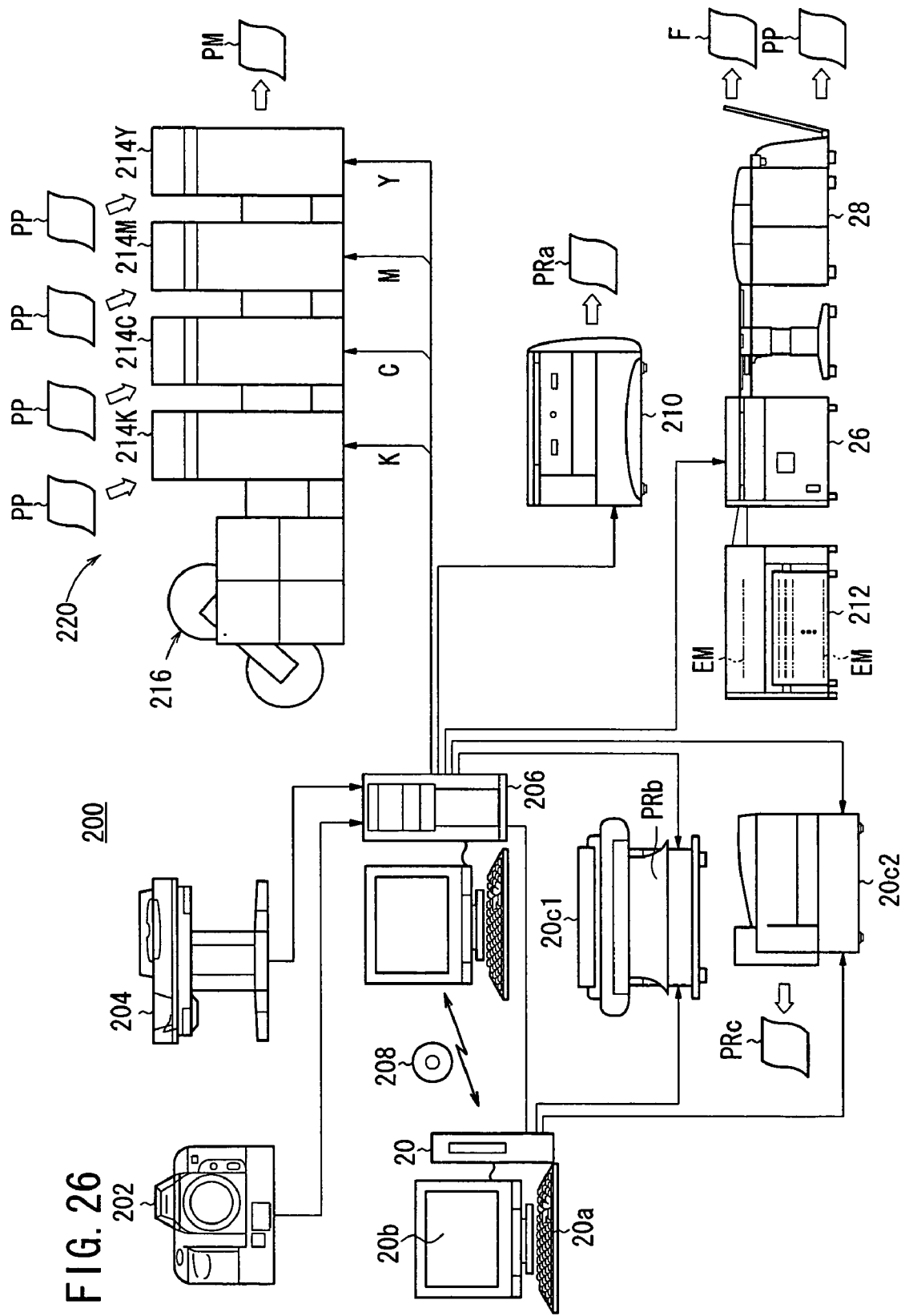
FIG. 26 is a block diagram of a printing/platemaking system incorporating threshold matrixes generated by a threshold matrix generating apparatus.
Figure 27:
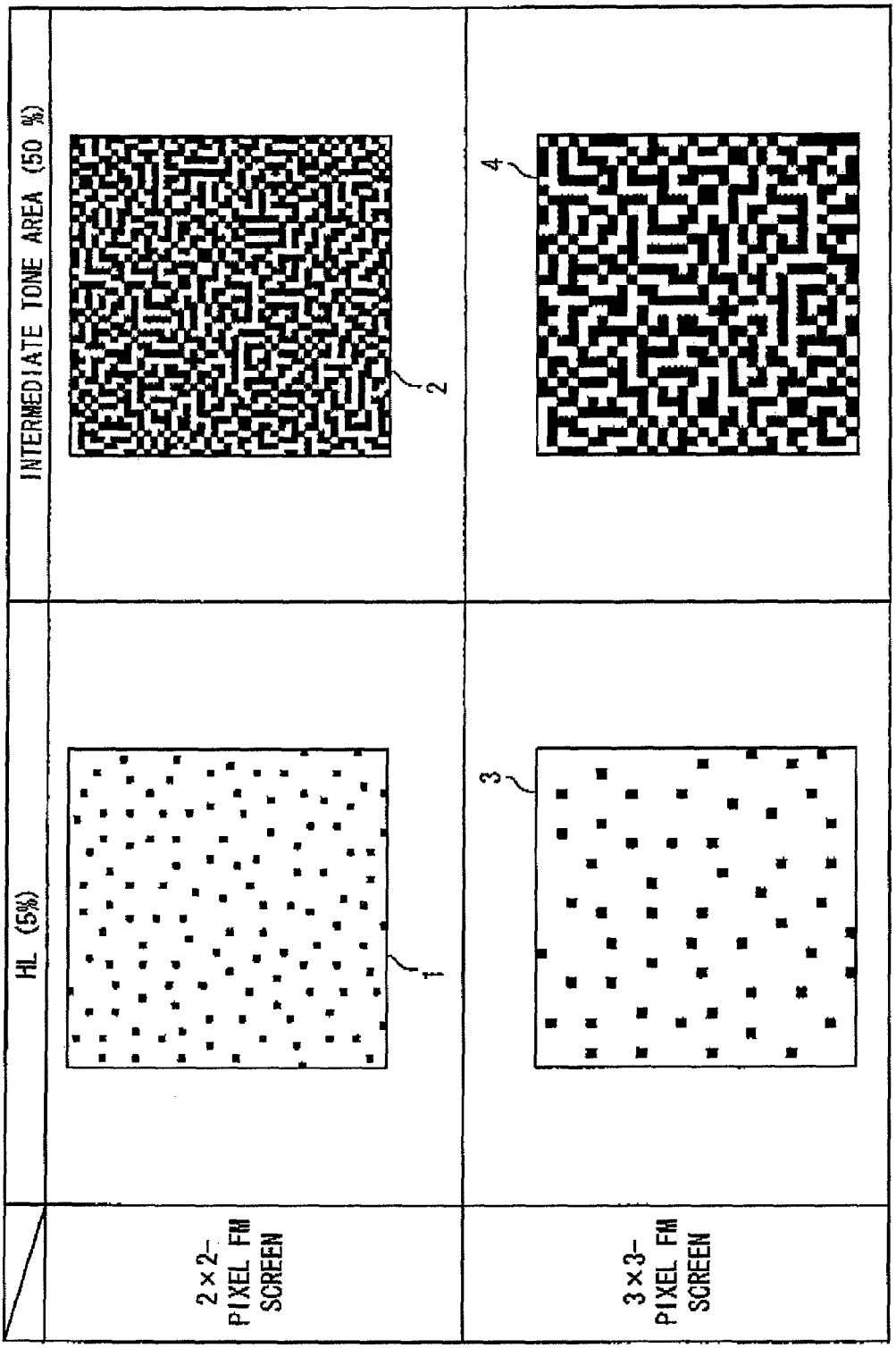
FIG. 27 is a diagram showing dot patterns at dot percentages of 5% and 50% of 2×2 pixel FM-screened dots and dot patterns at dot percentages of 5% and 50% of 3×3 pixel FM-screened dots according to conventional art.
Figure 28:
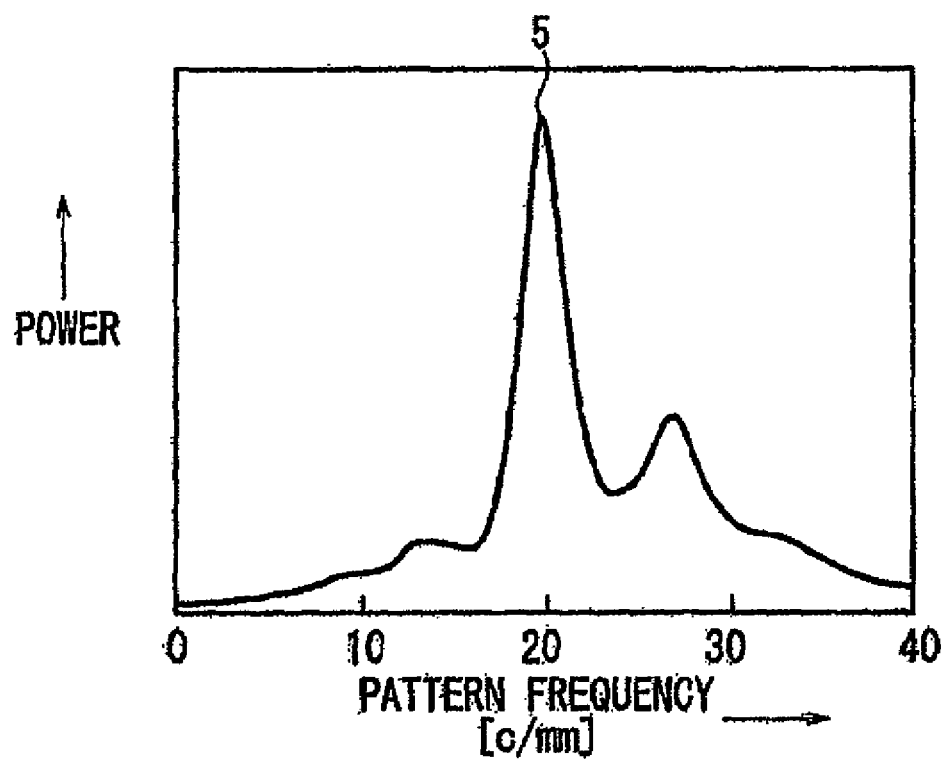
FIG. 28 is a diagram showing a power spectrum generated when the dot pattern at the dot percentage of 50% of the 2×2 pixel FM-screened dots is processed by FFT.
Figure 29:
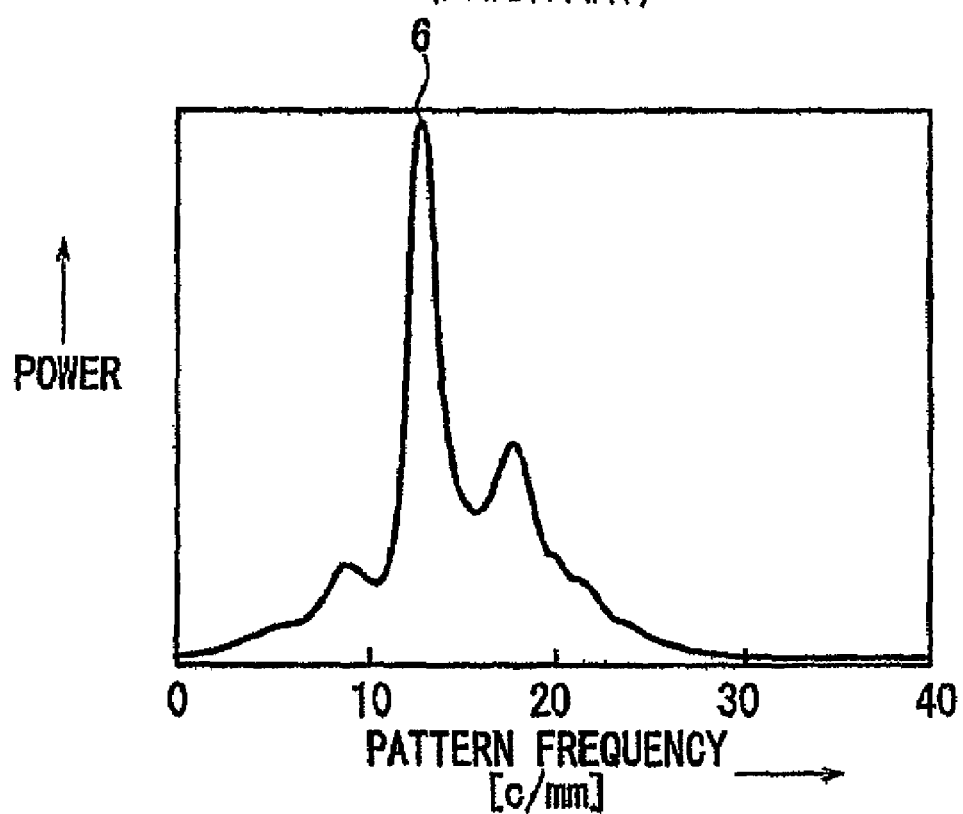
FIG. 29 is a diagram showing a power spectrum generated when the dot pattern at the dot percentage of 50% of the 3×3 pixel FM-screened dots is processed by FFT.

FIG. 26 shows a printing/platemaking system 200 incorporating threshold matrixes generated by the threshold matrix generating apparatus 20 of the threshold matrix generating system 10 shown in FIG. 1.

In the printing/platemaking system 200, RGB image data as continuous-tone image data captured by a digital camera 202 as an image capturing unit or RGB image data (or CMYK image data) as continuous-tone image data read by a plate input machine 204 as a scanner (image reader) are supplied to an RIP (Raster Image Processor) 206 as a color image separation apparatus, which converts the RGB image data into CMYK image data.

The RIP 206 stores in its hard disk data of threshold matrixes TM (threshold matrix data) for respective colors generated by the threshold matrix generating apparatus 20 and supplied through an optical disk 208 serving as a recording medium such as a CD-R or the like or through a communication link.

The RIP 206 compares the CMYK image data and the corresponding CMYK threshold matrix data with each other, and converts the CMYK image data into CMYK dot pattern data (CMYK image data).

The CMYK dot pattern data are then sent to a DDCP (Direct Digital Color Proofer) 210 (color image reproduction apparatus), which produces a print proof PRa on a sheet of paper. The DDCP 210 allows the operator to confirm noise components and printing quality on the print proof PRa before the image data are processed by a printing press 220 (color image reproduction apparatus). The sheet of paper used by the DDCP 210 may be a sheet of printing paper used by the printing press 220.

The RIP 206 delivers the CMYK dot pattern data to a color ink jet printer 20c1 (color image reproduction apparatus) which produces a printing proof PRb on a sheet of paper or a color electrophotographic printer 20c2 (color image reproduction apparatus) which produces a printing proof PRc on a sheet of paper.

The CMYK dot pattern data are also sent to the exposure unit 26 which serves as a filmsetter or a CTP apparatus in the output system 22 such as a CTC apparatus or the like. If the exposure unit 26 is a filmsetter, the automatic developing machine 28 generates a film F. The film F is superposed on a printing plate material, and exposed to light by a planar exposure unit (not shown), producing a printing plate PP. If the exposure unit 26 is a CTP apparatus as shown in FIG. 1, then the automatic developing machine 28 directly outputs a printing plate PP. The exposure unit 26 is supplied with printing plate materials EM or the like from a magazine 212 of photosensitive materials (including plate materials).

CMYK printing plates PP are mounted on plate cylinders (not shown) in a K-separation printer 214K, a C-separation printer 214C, an M-separation printer 214M, and a Y-separation printer 214Y of the printing press 220. In the K-separation printer 214K, the C-separation printer 214C, the M-separation printer 214M, and the Y-separation printer 214Y, the CMYK printing plates PP are pressed against a sheet of printing paper supplied from a printing paper supply unit 216 to transfer the inks to the sheet of printing paper, thereby producing a printed material PM on which a color image is reproduced. If the printing press 220 is configured as a CTC apparatus, then the RIP 206 supplies the CMYK dot pattern data directly through a communication link, and the printing plates mounted on the plate cylinders are exposed to record image data and then developed directly into printing plates PP.

Although certain preferred embodiments of the present invention have been shown and described in detail, it should be understood that various changes and modifications may be made therein without departing from the scope of the appended claims.

What is claimed is:

1. A method of generating a threshold matrix for producing each of color separations, the threshold matrix converting a continuous-tone image subjected to color separation into a dot pattern for each of the color separations, a color image being reproduced by overlaying the dot patterns, each of the dot patterns being a binary image in which no screen ruling or screen angle is defined, the method comprising the steps of:

determining a pattern frequency at a predetermined dot percentage of an intermediate tone; and filtering a white noise pattern with a bandpass filter having a different characteristic for each of the color separations, digitizing a filtered pattern for obtaining a binary pattern, and determining a dot candidate position for placing a dot in a dot pattern based on the obtained binary pattern to obtain an array of the threshold, the bandpass filter having a main frequency of a bandpass characteristic that is substantially same as the pattern frequency for all angles, intensity distribution of the bandpass characteristic being modulated based on angles, and the intensity distribution being varied based on each of the color separations, wherein peaks of the intensity distributions of the bandpass characteristic for angles do not overlap each other among the color separations.

2. A method according to claim 1, wherein when the dot pattern for each color separation is generated as a two-dimensional scanning image, the intensity distribution of the bandpass characteristic for angles is not present or is weakened in a scanning direction of the two-dimensional scanning image.

3. A method according to claim 1, wherein the color separations in which the intensity distribution of the bandpass characteristic for angles is varied comprise at least two color separations.

4. A method according to claim 1, wherein the color separations in which the intensity distribution of the bandpass characteristic for angles is varied comprise CM-separations, CMK-separations, or CMYK-separations.

5. A method according to claim 1, wherein the color separations in which the intensity distribution of the bandpass characteristic for angles is varied comprise CMYK-separations, and wherein frequency components of the CMYK-separations are spaced equiangularly.

6. A method according to claim 1, wherein the color separations in which the intensity distribution of the bandpass characteristic for angles is varied comprise main CMYK-separations as main colors and an auxiliary color separation other than the CMYK-separations, and wherein frequency components are spaced equiangularly for the main CMYK-separations and frequency components for the auxiliary color separation are provided between the equiangularly-spaced frequency components for the main CMYK-separations.

7. A method of reproducing a color image comprising:

overlaying dot patterns for color separations, using a threshold matrix for each of the color separations to convert a continuous-tone image subjected to color separation into a dot pattern for each of the color separations, each of the dot patterns being a binary image in which no screen ruling or screen angle is defined, wherein when the dot pattern for each of the color separations is converted into a pattern in a frequency domain, a main frequency component obtained by the conversion has a substantially-constant predetermined pattern frequency for all angles, and the intensity distribution of the main frequency component is varied based on each of the color separations, and wherein peaks of the intensity distributions of the main frequency components do not overlap each other among the color separations.

8. A method according to claim 7, wherein when the dot pattern for each color separation is generated as a two-dimensional scanning image, the intensity distribution of the main frequency component is not present or is weakened in a scanning direction of the two-dimensional scanning image.

9. A method according to claim 7, wherein the color separations in which the intensity distribution of the main frequency component is varied comprise at least two color separations.

10. A method according to claim 7, wherein the color separations in which the intensity distribution of the main frequency component is varied comprise CM-separations, CMK-separations, or CMYK-separations.

11. A method according to claim 7, wherein the color separations in which the intensity distribution of the main frequency component is varied comprise CMYK-separations, and wherein frequency components of the CMYK-separations are spaced equiangularly.

12. A method according to claim 7, wherein the color separations in which the intensity distribution of the main frequency component is varied comprise main CMYK-separations as main colors and an auxiliary color separation other than the CMYK-separations, and wherein frequency components are spaced equiangularly for the main CMYK-separations and frequency components for the auxiliary color separation are provided between the equiangularly-spaced frequency components for the main CMYK-separations.

13. The method according to claim 7, wherein the main frequency component in the frequency domain has a fluctuation component having a defined width.

14. The method according to claim 7, wherein the threshold matrix is used by the processor of a computer to convert a continuous-tone image subjected to color separation into a dot pattern for each of the color separations.

15. An apparatus for producing color separations comprising:
a threshold matrix storage unit, which stores a threshold matrix for each of color separations being used to convert a continuous-tone image subjected to color separation into a dot pattern for each of the color separations, each of the dot patterns being a binary image in which no screen ruling or screen angle is defined, a color image being reproduced by overlaying the dot patterns,
wherein when the dot pattern for each of the color separations is converted into a pattern in a frequency domain, a main frequency component obtained by the conversion has a substantially-constant predetermined pattern frequency for all angles, and the intensity distribution of the main frequency component is varied based on each of the color separations, and
wherein peaks of the intensity distributions of the main frequency components do not overlap each other among the color separations.

16. An apparatus according to claim 15, wherein when the dot pattern for each color separation is generated as a two-dimensional scanning image, the intensity distribution of the main frequency component is not present or is weakened in a scanning direction of the two-dimensional scanning image.

17. An apparatus according to claim 15, wherein the color separations in which the intensity distribution of the main frequency component is varied comprise at least two color separations.

18. An apparatus according to claim 15, wherein the color separations in which the intensity distribution of the main frequency component is varied comprise CM-separations, CMK-separations, or CMYK-separations.

19. An apparatus according to claim 15, wherein the color separations in which the intensity distribution of the main frequency component is varied comprise CMYK-separations, and wherein frequency components of the CMYK-separations are spaced equiangularly.

20. An apparatus according to claim 15, wherein the color separations in which the intensity distribution of the main frequency component is varied comprise main CMYK-separations as main colors and an auxiliary color separation other than the CMYK-separations, and wherein frequency components are spaced equiangularly for the main CMYK-separations and frequency components for the auxiliary color separation are provided between the equiangularly-spaced frequency components for the main CMYK-separations.

21. The apparatus according to claim 15, wherein the main frequency component in the frequency domain has a fluctuation component having a defined width.

22. A tangible computer readable medium encoded with a threshold matrix usable by a computer, for producing each of color separations, the threshold matrix converting a continuous-tone image subjected to color separation into a dot pattern for each of the color separations, a color image being reproduced by overlaying the dot patterns, each of the dot patterns being a binary image in which no screen ruling or screen angle is defined,
wherein when the dot patterns are produced for the color separations with the threshold matrixes and when the dot pattern for each of the color separations is converted into a pattern in a frequency domain, a main frequency component obtained by the conversion has a substantially-constant predetermined pattern frequency for all angles, and the intensity distribution of the main frequency component is varied based on each of the color separations, and
wherein peaks of the intensity distributions of the main frequency components do not overlap each other among the color separations.

23. The computer readable medium according to claim 22, wherein when the dot pattern for each color separation is generated as a two-dimensional scanning image, the intensity distribution of the main frequency component is not present or is weakened in a scanning direction of the two-dimensional scanning image.

24. The computer readable medium according to claim 22, further comprising program means to produce at least one color separated dot pattern.

25. The computer readable medium according to claim 22, wherein the main frequency component in the frequency domain has a fluctuation component having a defined width.

* * * * *